(12) United States Patent
Koplow

(10) Patent No.: US 8,213,070 B2
(45) Date of Patent: Jul. 3, 2012

(54) WAVE-PLATE STRUCTURES, POWER SELECTIVE OPTICAL FILTER DEVICES, AND OPTICAL SYSTEMS USING SAME

(75) Inventor: Jeffrey P. Koplow, San Ramon, CA (US)

(73) Assignee: Sandia Corporation, Albuquerque, NM (US)

( * ) Notice: Subject to any disclaimer, the term of this patent is extended or adjusted under 35 U.S.C. 154(b) by 18 days.

(21) Appl. No.: 12/767,327

(22) Filed: Apr. 26, 2010

(65) Prior Publication Data

US 2011/0157671 A1    Jun. 30, 2011

Related U.S. Application Data

(60) Provisional application No. 61/215,609, filed on May 6, 2009.

(51) Int. Cl.
*G02B 26/00*    (2006.01)

(52) U.S. Cl. ........................................................ 359/238

(58) Field of Classification Search .................. 359/238, 359/246, 250, 251, 483, 484, 485, 497; 385/11, 385/15, 18
See application file for complete search history.

(56) References Cited

U.S. PATENT DOCUMENTS

| | | | |
|---|---|---|---|
| 4,548,479 A | 10/1985 | Yeh | |
| 6,584,059 B1 | 6/2003 | Saimi et al. | |
| 7,027,135 B2 * | 4/2006 | Fu et al. ........................ | 356/73.1 |
| 2004/0169923 A1 | 9/2004 | Hug | |

OTHER PUBLICATIONS

J. P. Koplow and D. B. Soh, "The 4FAD: a high-extinction-ratio, achromatic, temperature-insensitive, high-damage-threshold, all-fiber, power-selective filter," in *CLEO:2011—Laser Applications to Photonic Applications*, OSA Technical Digest (CD) (Optical Society of America, 2011), paper CMZ5.

Fiber Logix, "In-Line Fiber Optic Polarizer Data Sheet", Aug. 2004, pp. 1-2.

R. H. Stolen, J. Botineau, and A. Ashkin, "Intensity discrimination of optical pulses with birefringent fibers", *Bell Laboratories*, Optics Letters, vol. 7, No. 10, Oct. 1982, pp. 512-514.

Zhang et al., Measurements and analyses of fields in fused tapered single-mode fiber couplers, Applied Optics, vol. 28, No. 11, Jun. 1989, pp. 2026-2030.

International Search Report and Written Opinion from International Application No. PCT/US2011/031446 dated Dec. 29, 2011.

\* cited by examiner

*Primary Examiner* — Ricky Mack
*Assistant Examiner* — Tuyen Tra
(74) *Attorney, Agent, or Firm* — Marcus S. Simon; Workman Nydegger

(57) ABSTRACT

In an embodiment, an optical filter device includes an input polarizer for selectively transmitting an input signal. The device includes a wave-plate structure positioned to receive the input signal, which includes first and second substantially zero-order, zero-wave plates arranged in series with and oriented at an angle relative to each other. The first and second zero-wave plates are configured to alter a polarization state of the input signal passing in a manner that depends on the power of the input signal. Each zero-wave plate includes an entry and exit wave plate each having a fast axis, with the fast axes oriented substantially perpendicular to each other. Each entry wave plate is oriented relative to a transmission axis of the input polarizer at a respective angle. An output polarizer is positioned to receive a signal output from the wave-plate structure and selectively transmits the signal based on the polarization state.

49 Claims, 20 Drawing Sheets

WAVE-PLATE STRUCTURES, POWER SELECTIVE OPTICAL FILTER DEVICES, AND OPTICAL SYSTEMS USING SAME

CROSS-REFERENCE TO RELATED APPLICATION

This application claims the benefit of U.S. Provisional Application No. 61/215,609 filed on May 6, 2009, the disclosure of which is incorporated herein, in its entirety, by this reference.

STATEMENT REGARDING GOVERNMENT RESEARCH AND DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

Optical fiber amplifiers are used in a wide variety of important applications. An optical fiber amplifier typically includes a core region that is doped with at least one active element (e.g., a rare earth element) to provide gain. Examples of rare-earth dopants used in fiber amplifiers include Er, Yb, Nd, and Tu. Er-doped fiber amplifier technology is predominant in fiber optic communications applications because the range of wavelength over which Er-doped silica provides optical amplification (typically 1530 to 1580 nm) roughly coincides with the wavelength for minimum transmission loss in silica fiber. Yb-doped amplifiers, which typically provide amplification in the 1030 to 1100 nm range, are predominant in non-communications applications. This is primarily due to their high wall plug efficiency and scalability to extremely high average powers (multiple kW).

Roughly speaking, there are three distinct operating regimes for rare-earth-doped fiber laser technology. Fiber amplifiers can be configured as continuous wave ("cw") sources, low-energy-pulse sources, and high-energy-pulse sources.

When operated in cw mode, the fiber laser output power as a function of time is nominally constant, and the population inversion of the gain medium is in steady state equilibrium. Energy is extracted from the gain medium by stimulated emission at substantially the same rate that energy is delivered to the gain medium by absorption of pump light photons. Common cw fiber laser configurations include the master oscillator power amplifier ("MOPA"), in which a fiber amplifier is seeded by a low-power cw seed source, and various cw fiber laser architectures in which some form of regenerative feedback (e.g. fiber Bragg grating mirrors) and a partially transmitting output coupler are used in conjunction with a fiber amplifier, either in a linear or ring-shaped cavity. Also included in this first category are "quasi-cw" fiber lasers, involving intermittent cw operation for periods of time well in excess of the energy storage time of the fiber amplifier gain medium.

When operated in the low-energy-pulse mode, the total energy extracted by each pulse is a very small fraction of that stored in the fiber amplifier gain medium. Therefore, as in a cw fiber laser, the population inversion as a function of time is substantially constant. Examples of fiber amplifiers operating in the low-pulse-energy regime include amplification of high-bit rate signals, and mode-locked fiber lasers. In the former application (e.g. telecommunications), the pulse train is a pseudo-random train of ones and zeroes that may be modeled as a square wave of very high frequency (e.g., GHz) having a nominal duty cycle of 50%. Mode-locked fiber lasers, on the other hand, generate a low duty cycle (e.g. 1%) periodic waveform in which the peak power of each pulse may exceed the average output power by two or more orders of magnitude. Nonetheless, the total energy extracted by each pulse is a very small fraction of the energy stored in the fiber amplifier gain medium, such that the population inversion of the gain medium is substantially constant as a function of time. Typical pulse energies, pulse durations, and pulse repetition rates for mode-locked fiber lasers may be 0.1 to 100 nJ, 0.1 to 1000 ps, and 1 to 100 MHz, respectively.

The high-energy-pulse regime is distinctly different than the cw and low-energy-pulse regimes in that amplification occurs under non-steady-state-equilibrium conditions. The energy extracted by each pulse is a significant fraction of that stored in the fiber gain medium, and the population inversion of the gain medium is not constant as a function of time. Fiber laser configurations for operation in the high-energy-pulse regime include q-switched fiber lasers, fiber amplifiers seeded by high-peak-power sources such as passively q-switched micro-chip lasers, and appropriately configured multistage fiber amplifier chains used in conjunction with a low-peak-power seed sources such as pulsed diode lasers. Typical pulse energies, pulse durations, and pulse repetition rates may be 10 to 1000 µJ, 1 to 100 ns, and 1 to 100 kHz, respectively.

The high-energy-pulse regime poses significant challenges to efficient operation of lasers and other types of amplifiers.

SUMMARY

Embodiments of the invention are directed to wave-plate structures and power selective optical filter devices, such as optical switch structures and optical limiter structures. A number of optical systems are also disclosed that employ such wave-plate structures and power selective optical filter devices in various applications.

In an embodiment, a wave-plate structure includes a first substantially zero-order, zero-wave plate and a second substantially zero-order, zero-wave plate arranged in series with the first substantially zero-order, zero-wave plate and oriented at a selected angle relative to the first substantially zero-order, zero-wave plate. The first and second substantially zero-order, zero-wave plates are configured to alter a polarization state of an input signal passing therethrough in a manner that is dependent on the power of the input signal. Each of the first and second substantially zero-order, zero-wave plates includes an entry wave plate having a slow axis and a fast axis, and an exit wave plate having a slow axis and a fast axis. The fast axis of the entry wave plate is oriented substantially perpendicular to the fast axis of the exit wave plate. The slow axis of the exit wave plate of the first substantially zero-order, zero-wave plate is oriented at about 40 to about 50 degrees (e.g., about 45 degrees) to the slow axis of the entry wave plate of the second substantially zero-order, zero-wave plate.

In an embodiment, a power selective optical filter device includes an input polarizer having a transmission axis. The input polarizer is configured to selectively transmit at least a portion of an input signal therethrough, which exhibits a polarization state and a power. The power selective optical filter device also includes a wave-plate structure positioned to receive the at least a portion of the input signal transmitted through the input polarizer. The wave-plate structure includes a first substantially zero-order, zero-wave plate and a second substantially zero-order, zero-wave plate arranged in series with the first substantially zero-order, zero-wave plate and oriented at a selected angle relative to the first substantially zero-order, zero-wave plate. The first and second substantially zero-order, zero-wave plates are configured to alter the polarization state of the at least a portion of the input signal passing therethrough in a manner that is dependent on the power of the at least a portion of the input signal. Each of the first and second substantially zero-order, zero-wave plates includes an entry wave plate having a fast axis and an exit wave plate having a fast axis. The fast axis of the entry wave plate is oriented substantially perpendicular to the fast axis of the exit wave plate. Each of the entry wave plates of the first and second substantially zero-order, zero-wave plates is oriented relative to the transmission axis of the input polarizer at a respective selected entry-wave-plate angle. The power selective optical filter device further includes an output polarizer positioned to receive the polarization-state-altered signal output from the wave-plate structure. The output polarizer is configured to selectively transmit at least a portion of the polarization-state-altered signal based on the polarization state thereof.

In an embodiment, a method of selectively modifying an input signal using a power selective optical filter device including a wave-plate structure disposed between an input polarizer and an output polarizer is disclosed. The method includes transmitting at least a portion of the input signal through the input polarizer and into the wave-plate structure, altering a polarization state of the input signal as the input signal passes through the wave-plate structure in a manner that is dependent on the power of the input signal, transmitting the altered-polarization-state signal out of the wave-plate structure, and selectively blocking at least a portion of the altered-polarization-state signal with the output polarizer based on a polarization state thereof or selectively transmitting at least a portion of the altered-polarization-state signal through the output polarizer based on a polarization state thereof.

In an embodiment, an optical fiber system includes one or more of the disclosed power selective optical filter devices disposed between first and second optical fiber amplifiers. In such an embodiment, the optical filter device may be used to at least partially block amplified spontaneous emission ("ASE") generated by the first optical fiber amplifier from being further amplified by the second optical fiber amplifier and vice versa.

In an embodiment, one of the disclosed power selective optical filter devices may be used to optically isolate a pulsed laser source (e.g., from reflections, undesired optical feedback, etc.).

In an embodiment, one of the disclosed power selective optical filter devices may be used to alter the temporal shape (e.g. power as a function of time) of one or more laser pulses. Such alteration of the temporal pulse shape may include, but is not limited to, blocking of high-power optical surges, filtering out low-power secondary pulses (e.g. such as those produced by some passively q-switched micro-chip lasers), removing one or more low-power "pedestals" or "wings" from a pulsed waveform, steepening the temporal profile of a pulsed waveform, narrowing the temporal profile of a pulsed waveform, and/or splitting a pulsed waveform into two or more shorter duration pulses.

In an embodiment, one or more of the disclosed power selective optical filter devices may be used to improve the extinction ratio of an active optical switching device (e.g. a Pockels cell).

In an embodiment, one or more of the disclosed power selective optical filter devices may be used to improve the extinction ratio of another passive optical switching device (e.g. a second power selective optical filter as described herein, or a different type of passive optical switching device such as a saturable absorber).

In an embodiment, one or more of the disclosed power selective optical filter devices may be used in a cw laser cavity to reduce relative intensity noise, prevent or suppress amplitude fluctuations, or combinations of the foregoing.

In an embodiment, one or more of the disclosed power selective optical filter devices may be used to limit the amplitude of an optical signal undergoing subsequent amplification to prevent the amplified signal from exceeding the damage threshold of one or more active and/or passive optical components.

Other embodiments pertain to applications of nonlinear optical filter devices (e.g., saturable absorbers). The textbook *Applications of Nonlinear Fiber Optics* by G. P. Agrawal (Academic Press, New York, 2001) provides a comprehensive review of this subject matter. For example, power selective optical filters such as saturable absorbers may be used as all-optical switches, or may be used to construct passively mode-locked laser systems. In the former application, passage of an "input signal" that is normally blocked by a power selective optical filter may be enabled by the application of a "control signal" (usually at a different wavelength and/or propagating in a different direction than the input signal) that switches the power selective optical filter to its high-transmittance state. In the later application, a power selective optical filter may be used to discriminate against an ensemble of longitudinal modes in a laser cavity having a random phase relationship, in favor of an ensemble of longitudinal modes having a phase relationship that corresponds to a low-duty-cycle, high-peak-amplitude, periodic, pulsed waveform.

Accordingly, in one embodiment, one or more of the disclosed power selective optical filter devices may be used for optical switching of one or more input signals by one or more control signals.

In an embodiment, one or more of the disclosed power selective optical filter devices may be used in a laser cavity to affect and/or assist passively mode-locked operation.

In an embodiment, one or more of the disclosed power selective optical filter devices may be used in a laser cavity to assist actively mode-locked operation.

In an embodiment, one or more of the disclosed power selective optical filter devices may be used in a laser cavity to affect and/or assist passively q-switched operation.

In an embodiment, one or more of the disclosed power selective optical filter devices may be used in a laser cavity to assist actively q-switched operation.

In an embodiment, one or more of the disclosed power selective optical filter devices may be used in a laser cavity to assist and/or affect simultaneously q-switched and mode-locked operation.

In an embodiment, one or more of the disclosed power selective optical filter devices may be used to assist or affect laser cavity dumping.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

I. Introduction

Figure 1:
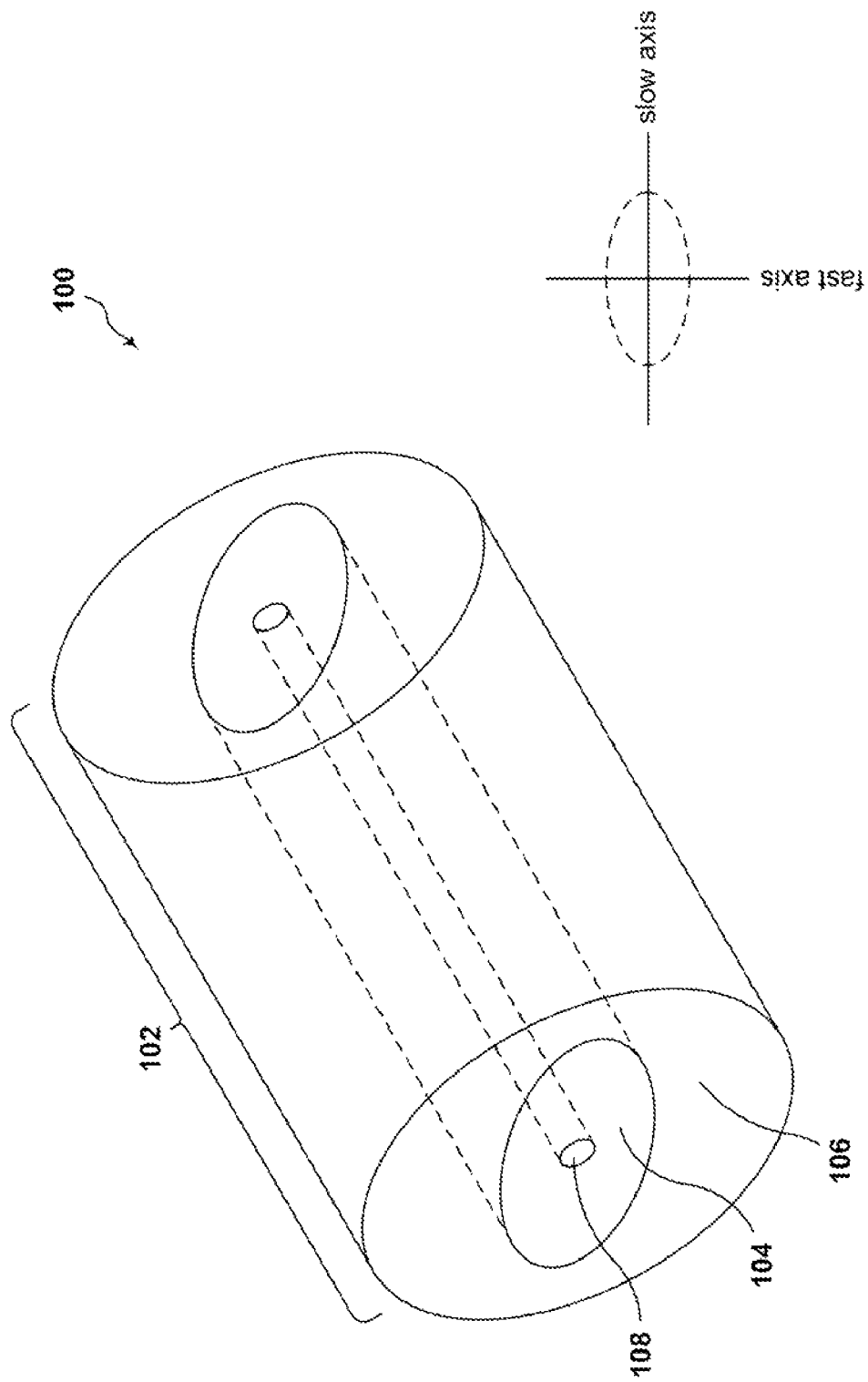
FIG. 1 is an isometric view of an example of a linearly birefringent passive optical component commonly referred to as a "wave plate" or "optical retarder."

Embodiments of the invention are directed to wave-plate structures and power selective optical filter devices, such as optical switch structures and optical limiter structures. A number of optical systems are also disclosed that employ such wave-plate structures and power selective optical filter devices in various applications.

One or more of the embodiments disclosed herein may provide an all-fiber, achromatic, nonlinear optical switching device that transmits high-peak-power pulses with very low-insertion-loss, but provides bi-directional blocking of low-peak-power and/or cw signals with very high extinction ratio. Such an optical switching device enables the construction of multi-stage fiber amplifiers having bi-directional isolation of ASE between successive fiber amplifiers, thereby enabling ultra-high-gain pulse amplification.

The ability to rigorously divide such an ultra-high-gain fiber amplifier into separate, lower gain sections also circumvents small-signal-gain limitations that would otherwise be imposed by cw parasitic lasing associated with in-fiber Rayleigh scattering. Such a nonlinear optical switching device may eliminate the need for Faraday isolators, wavelength filters, and amplitude modulators used in current state-of-the-art multi-stage fiber amplifiers, while at the same time providing much higher pulse amplification gain. More broadly, such a nonlinear optical switching device may eliminate high-peak-power seed sources and/or high performance q-switches as prerequisites to successful development of fiber technology for the high-energy-pulse regime.

II. Overview of Problems Operating in the High-Energy Pulse Regime

The inventor has appreciated numerous problems that occur when operating in the high-energy pulse regime. When operating in the high-energy-pulse regime, typically the objective is to store as much energy in a gain medium as possible, and then to extract as much of this energy as possible in the form of a brief pulse having extremely high peak power. The output pulse trains of such high energy pulsed fiber lasers may typically have duty cycles of order 0.0001 to 0.1%, and peak powers in the 1 to 1000 kW range. In contrast to the case of cw and low-energy-pulse lasers, when operated in the high-energy-pulse regime, the small-signal gain of the fiber amplifier is not clamped to low values by continuous extraction of power from the gain medium. Rather, between pulses the population inversion (and thus the small-signal gain and stored energy) is allowed to build up to very high levels, and is typically limited only by amplified spontaneous emission.

ASE is the amplification of photons generated by spontaneous emission (fluorescence) emitted by the excited-state rare-earth ions of the gain medium. A small fraction of this omni-directional fluorescent emission falls within the capture angle of the fiber optic waveguide. Once captured, these spontaneous emission photons propagate down the fiber (in both directions) and are therefore subject to amplification. The number of spontaneous emission photons generated per unit time is linearly proportional to the population inversion, but the amount of amplification they receive within the fiber amplifier is exponentially proportional to the population inversion. Thus, in cw and low-energy-pulse systems, where the population inversion is clamped to a low, constant value, the effects of amplified spontaneous emission on device operation are typically of no particular significance. On the other hand, if the population inversion is allowed to build-up indefinitely, eventually the small-signal gain of the amplifier becomes so large (e.g. 40 dB) that ASE photons are generated at a rate that is comparable to the rate at which pump photons are absorbed by the gain medium. In this high-pump-power limit, the steady state population inversion transitions from a linear to a logarithmic dependence on pump power.

Thus, ASE imposes practical limitations on the maximum amount of energy that can be stored in the gain medium and the maximum amount of small-signal gain that can be attained in a single-stage amplifier. The limited energy storage places an upper bound on fiber laser pulse energy. The limited small-signal gain has important consequences because of the technological limitations (low peak power) of pulsed seed sources.

For example, passively q-switched micro-chip lasers generating ns-duration pulses with peak powers of order 1 to 10 kW are well suited to operation of fiber lasers in the high-energy-pulse regime. A single-stage fiber amplifier seeded by a micro-chip laser seed source may easily generate pulse energies of several hundred µJ and peak powers of several hundred kW. But passively q-switched micro-chip lasers are available only at a few discrete wavelengths, provide little or no adjustability of temporal pulse shape, duration and repetition rate, and are prohibitively expensive for many real-world applications. A further drawback of using micro-chip lasers in conjunction with high gain fiber amplifiers is the need to optically isolate the highly reflective micro-chip laser output coupler from the fiber amplifier. Typically, a two-stage Faraday isolator is required to obtain adequate isolation. This is a serious drawback because most high-energy-pulse sources are based on Yb-doped fiber lasers operating in the 1040 to 1080 nm range; there is a limited choice of non-absorbing Faraday rotator materials in this wavelength range, and the resulting Faraday isolators are large, heavy, and expensive.

Unlike micro-chip laser seed sources, laser diode seed sources, which are available at a wide range of wavelengths, provide complete flexibility with respect to pulse shape, duration, and repetition rate, and are not prohibitively expensive. However, the relatively low peak power available from pulsed laser diode seed sources having adequate beam quality to couple efficiently into the lowest-order transverse mode of a fiber laser (1 to 10 W, limited primarily by the low optical damage threshold of semi-conductor materials), when used in conjunction with a single-stage fiber amplifier, falls far short of what's required to reach the high-energy-pulse regime. Similar considerations apply to pulsed seed laser sources comprising a low-power cw or long-pulse-duration laser that is "chopped" or "gated" by an external amplitude modulator.

At first this may seem perplexing given that single-stage fiber amplifiers having small-signal gains of order 40 dB are readily available; this would seem to imply that a pulsed diode laser seed source with a peak power of 10 W could be amplified to a peak power of 100 kW. But recall that operation in the high-energy-pulse regime implies that the energy extracted by each pulse is a significant fraction of that stored in the fiber gain medium. If, for example, half of the energy stored in a four-level laser system (e.g., as an Nd-doped fiber amplifier) is extracted, the fiber amplifier gain collapses from 40 dB to 20 dB (a factor of 100), effectively turning off the amplification process. The situation is even worse in quasi-three-level laser systems such as Yb, Er, and Tu, in which a significant fraction of the population inversion is used to simply to bleach the fiber to transparency (i.e. to reach 0 dB gain) because of ground state absorption. Thus, Yb, Er, and Tu fiber lasers are even more sensitive to gain depletion during pulse amplification. This is a reminder that the word "small" in "small-signal gain" denotes fiber amplifier gain in the limit of a small amplitude seed signal, where negligible depletion of the population inversion occurs during signal amplification.

Thus, despite the fact that fiber amplifiers offer very high small-signal gain, in practice, to access the high-energy-pulse regime, requirements for seed laser peak power and/or pulse energy are quite demanding. Moreover, operation of fiber amplifiers at extremely high gain results in poor efficiency because a substantial fraction of the output power of the fiber amplifier is in the form of cw ASE between pulses. It is also difficult to operate at extremely high gain because even very small back-reflections (e.g. at optical interfaces) along the optical signal path can result in parasitic lasing. Parasitic lasing can place an even more stringent limit on fiber amplifier gain and stored energy than ASE. In light of these considerations, in practice, fiber amplifiers operated in the high-energy-pulse regime typically provide on the order of 15 to 25 dB amplification of pulse energy.

In addition to direct amplification of an external seed source, another approach that can be used to attempt operation in high-energy-pulse regime is q-switching. For example, in a q-switched Nd:YAG laser, a large population inversion is allowed to build up in the gain medium, during which time regenerative feedback (and therefore lasing) is blocked by one or more q-switching elements, such as a high-speed electro-optic shutter. The q-switch is then suddenly switched to its high-transmittance state, thereby allowing regenerative feedback in the laser cavity. For example, such a laser cavity may be comprised of a gain medium and optical shutter sandwiched between a first mirror having 100% reflectivity and a second mirror having only 50% reflectivity (the output coupler). Shortly after q-switch is opened, the resulting intra-cavity avalanche of photons is transmitted through the output coupler, generating a high-energy pulse with a duration of one to several times the round-trip transit time for circulation of light through the laser cavity (typically one to tens of ns).

But the application of q-switching to fiber lasers, rather than bulk solid-state lasers, has been hampered by several difficulties. Q-switched operation requires that the fiber amplifier be operated at very high small signal gain, for two reasons. The first reason is the lack of availability of q-switching devices with very low insertion loss that can be incorporated directly into the fiber. This precludes the construction of a high-q (i.e. low loss) q-switched fiber laser cavity. The latter requirement, that such a q-switch be incorporated directly into the fiber, stems from the high losses associated with fiber-to-free-space-to-fiber coupling (e.g. if a bulk-optic q-switch is used). Thus, it is not possible to construct a conventional low-loss Q-switched laser cavity in which the build-up of a high-energy-pulse from intracavity ASE involves a large number of successive passes through the gain medium, such that the need for high small-signal gain is obviated. Rather, because of cavity losses, q-switched fiber lasers must generally be designed for pulse build up over a relatively small number of passes, which necessitates the use of very high-small signal gain (such that the vast majority of energy extracted by pulse occurs during its final pass through the amplifier, after which the pulse immediately exits the fiber amplifier). This, in turn, requires that the fiber laser q-switch have extremely high extinction ratio (i.e., low leakage when the q-switch is in the "off" state). The extinction ratio of available q-switches is in many cases inadequate (resulting in parasitic lasing). The second reason that the fiber amplifier must be operated at high-small-signal gain is that it must store as much energy as possible. The small cross-sectional area of a fiber (compared to a bulk gain medium such as a Nd:YAG rod) means that energy storage is at a premium, and thus compels operation at high population inversion.

The application of passive rather than active q-switching to fiber amplifiers is hampered by the fact that the absorption cross-sections of available saturable absorber materials are too small (typically $10^{-18}$ to $10^{-17}$ cm$^2$) to be of practical use. On the one hand, operation of the fiber amplifier at very high gain necessitates that the unbleached saturable absorber have very high optical density. This requires a very large number of absorbing species because the absorption cross sections for available materials are relatively small. But a very large number of absorbing species implies that a very large number of photons must be absorbed to switch the saturable absorber from its absorbing state to its transmitting state. For a fiber amplifier, the amount of pulse energy consumed by such saturable absorbers can be highly prohibitive.

A further difficulty with the application of conventional q-switching to fiber lasers is concerns pulse duration. As mentioned earlier, q-switching generates pulse durations of order one to several times the cavity round trip time. In the case of fiber lasers, this typically implies q-switched pulse durations of order 100 ns. Such long pulse durations are undesirable in many applications. For example, very high peak power may be required for efficient nonlinear frequency conversion, or short pulse duration may be required to meet the spatial resolution requirements of optical ranging applications. The use of short pulse durations to inhibit Stimulated Brillouin scattering ("SBS") is frequently a requirement as well. As a result, pulse durations of order 1 ns are typically considered most desirable. This makes q-switching of fiber lasers rather awkward. Even if an appropriate saturable absorber material was available, passive q-switching would generate long-duration pulses. Active q-switching is possible, but requires an optical shutter having very high extinction ratio that can execute a "closed-open-closed" switching cycle in a period of time of order 1 ns, and repeat this operation several times over a span of a few hundred ns; typically three to five passes through the fiber laser gain medium are required to generate a high-energy-pulse from regenerative amplification of ASE.

The remaining alternative is the use of pulsed laser diode seed sources in conjunction with multi-stage fiber amplifiers. In fact, the use of two or more fiber amplifiers in series would appear to be the obvious solution to the problem of low-peak-power seed sources. But the implementation of such a pulsed laser architecture is badly undermined by ASE. For example, if two nominally identical Nd fiber amplifiers, each having a small-signal gain of 40 dB are spliced together, the result is not a fiber amplifier with a small-signal gain of 80 dB. Rather, the first nominally 40 dB fiber amplifier is flooded by high-average-power ASE generated by the second nominally 40 dB fiber amplifier, and likewise, the second nominally 40 dB fiber amplifier is flooded by high-average-power ASE from the first nominally 40 dB fiber amplifier. This bi-directional exchange of high-power ASE results in very strong mutual gain depletion. The end result is that such a two-stage Nd-doped fiber amplifier behaves like a single-single fiber amplifier having twice the length of the original amplifier, an approximately a two-fold increase in maximum average output power, but still only ~40 dB of small-signal gain. There is also no significant improvement in stored energy. Bi-directional exchange of ASE has in effect turned both 40 dB fiber amplifiers into 20 dB fiber amplifiers. In addition to not providing higher small-signal gain, given the interest in generating high-peak power pulses, a factor of two increase in fiber length is counterproductive from the standpoint of suppressing nonlinear processes such as Stimulated Brillouin scattering, Stimulated Raman scattering ("SRS"), self phase modulation, cross phase modulation, four-wave mixing, etc. In the case of quasi-three-level laser systems such as Yb, Er, and Tu, the wavelength distribution of the fiber gain curve also changes (shifts to longer wavelengths). This can, in fact, cause a net reduction in small-signal gain at the intended operating wavelength.

Because of the ASE problem, multistage amplification can only provide significant benefit if one or more measures are taken to limit the exchange of ASE between successive fiber amplifiers. For example, some degree of improvement can be realized by placing optical isolators between successive fiber amplifiers. Then in principle, multi-stage amplification of ASE can only occur in one propagation direction. In an n-stage fiber amplifier, this allows the first amplifier in the chain to be isolated from ASE generated by the rest of the amplifier chain, and provides a minor improvement in small-signal gain for amplifiers 2 through n. The efficacy of this technique is modest however, and in practice somewhat degraded by the fact that Faraday isolators typically only provide high extinction ratio over a narrow range of wavelengths (compared to the range of wavelengths contained in the ASE spectrum of a typical fiber amplifier). On the other hand, because ASE has a relatively broad spectral distribution, the addition of n−1 band pass filters, one at each amplifier-amplifier interface, can be used to restrict the range of wavelengths over which ASE is transmitted between amplifiers. For example, such a filter may transmit only 1% of the spectrally broad ASE signal impinging on it from each side (and also addresses the problem that Faraday isolators are not achromatic devices). Unfortunately much of this 20 dB reduction in ASE seed signal is offset in an n-stage amplifier because within the spectral window provided by the series combination of n−1 band pass filters, ASE can still propagate through the entire length of the amplifier chain. Thus, even if the path provided for inter-stage ASE propagation is restricted to one direction of propagation and a relatively narrow wavelength region, such a multi-stage architecture still provides a very effective mechanism for gain clamping, because of power extraction by narrowband ASE and/or narrowband parasitic lasing.

Typically the last resort to combat the problem of inter-stage ASE is to gate the amplification process temporally using n−1 optical shutters having high extinction ratio. Available amplitude modulators having low insertion loss suffer from relatively low extinction ratio, low damage threshold, and/or slow switching time, however. To understand the effect of slow switching time, consider multi-stage amplification of a 1-ns-duration seed pulse in a system gated by acousto-optic amplitude modulator having a rise/fall time of 100 ns. The amplified output waveform will consist of a 1-ns-pulse sitting on top of a ~100-ns-wide "pedestal" of amplified ASE. The energy contained in the pedestal portion of the pulsed waveform may be comparable to or greater than the energy contained in the amplified seed pulse, in which case the resulting penalty in efficiency is substantial. The presence of such a pedestal can be detrimental in some applications as well. A large spectral pedestal will also accompany the wavelength spectrum of the amplified pulse, which is also undesirable in some applications. In addition to the fact that the above counter-measures for ASE exchange between successive stages of amplification are not particularly effective, the size, cost, and complexity of such additional hardware has proven prohibitive in many applications.

Having described the extremely detrimental effects of fiber laser ASE on both fiber laser performance and practicality, it is important emphasize that all of the ASE-related problems discussed thus far arise in the context of high-energy-pulse operation. Operation of fiber lasers in the cw and low-energy-pulse regimes is not significantly affected by ASE because power is extracted from the fiber gain medium on a continuous basis using seed power provided on a continuous basis by an external seed source or wavelength-selective regenerative feedback, either of which can be made orders of magnitude more powerful than the effective seed power generated by spontaneous emission.

On the other hand, the inadequate peak power available from practical seed sources such as laser diodes, and to a lesser extent, the need to operate at high population inversion to store as much energy as possible, render an externally seeded fiber amplifier architecture impractical for operation in the high-pulse-energy regime (unless the numerous drawbacks of micro-chip laser seed sources or multi-stage fiber amplifier configurations can be tolerated). If instead, it is attempted to access the high-pulse-energy regime using regenerative feedback rather than an external seed source, we find that existing q-switch technology imposes severe limitations. To successfully apply fiber laser technology to the high-pulse-energy regime, it appears that either (1) an alternative pulsed seed source that preserves the numerous advantages of diode lasers, but circumvents the intrinsically low optical damage threshold of semi-conductor materials must be developed, (2) a q-switch that can meet all of the stringent performance requirements described earlier must be developed, or (3) the problem of ASE exchange in multistage amplifiers must be solved.

This perspective on the successes and failures of fiber amplifier technology with regard to operation in the cw, low-energy-pulse, and high-energy-pulse regimes leads directly to consideration of specifically what optical component technologies are missing in the current state of the art. Major advances in fiber laser technology thus far include (1) the development of rare-earth-doped fiber laser technology itself, (2) the invention of the cladding pumped fiber amplifier, (3) the discovery of photosensitivity and subsequent invention of techniques for external writing of fiber Bragg gratings, the invention and development of (4) fused fiber coupler technology (e.g., wavelength division multiplexing in telecommunications), (5) polarization maintaining fiber, (6) methods for obtaining diffraction limited output from highly multimode gain fibers, (7) the adoption of mode-locking and chirped pulse amplification techniques from the field of ultrafast solid-state lasers, (8) the invention and development of micro-structured fiber technology (also known as "holey", "photonic band gap", and/or "photonic crystal" fibers), (9) the development of high-power, high-brightness pump diodes suitable for pumping double-clad fibers, and (10) the development of fused-fiber-bundle components for high pump power delivery.

Notable deficiencies in fiber laser technology include lack of (1) a practical source of high-power, broad-band, diffraction-limited pump light suitable for pumping fiber Raman amplifiers (e.g. for long-haul fiber telecommunications), (2) adequate process control in rare-earth-doped fiber fabrication (mode-scrambling effects due to fiber perform inhomogeneities and an inability to fabricate optimized refractive index and/or dopant distributions currently limit the maximum core diameter from which diffraction-limited output can be obtained), (3) resolution of issues associated with rare-earth-doped fiber photo-darkening, (4) availability of certain optical components in all-fiber form (e.g. to avoid insertion losses associated with coupling, simplify fiber laser architecture, and/or provide increased reliability), (5) high-performance amplitude modulators (having very high extinction ratio, low insertion loss, fast switching times, and high damage threshold in the form of a compact, low-cost device), (6) satisfactory optical isolator technology at wavelengths below 1100 nm, (7) practical pulsed seed sources for operation of single-stage fiber amplifiers in the high-energy-pulse regime, and (8) a method for multi-stage-fiber-amplifier pulse amplification that provides far better performance, and far better practicality than state of the art multi-stage fiber amplifier systems.

III. Overview of Wave Plates and Substantially Zero-Order, Zero-Wave Plates

Before discussing the various different embodiments of the invention directed to wave-plate structures and power selective optical filters in Section IV hereinbelow, the structure and function of a wave plate and a substantially zero-order, zero-wave plate is discussed with respect to FIGS. 1 and 2. FIG. 1 is an isometric view of an example of a linearly birefringent passive optical component 100, commonly referred to as a "wave plate" or "optical retarder". The wave plate 100 includes a segment 102 of elliptically clad polarization maintaining ("PM") fiber. Such PM fiber incorporates one or more stress-applying structural elements 104 embedded in a fiber cladding 106 that subject a core region 108 of the fiber segment 102 to a mechanical stress field having substantially bilateral symmetry. Examples of commercially available polarization maintaining fiber include, but are not limited to, "Panda" PM fiber (which uses stress rods that are nominally circular in cross section), "Bow-tie" PM fiber (in which the stress rods take the form of annular wedges), and elliptical clad PM fiber (in which an elliptically shaped cladding such as the fiber cladding 104 generates the required stress field). As a result of the elasto-optic effect, the segment 102 of PM fiber acts as a linearly birefringent waveguide, having a "high-index" or "slow" transverse axis substantially parallel to the major axis of the elliptical cladding (or substantially parallel to the plane of the stress rods in a non-elliptical-cladding PM fiber), and a "low-index" or "fast" transverse axis substantially perpendicular to the major axis of the elliptical cladding (plane of the stress rods). In this context, the term "high-index" ("low-index") refers to the waveguide refractive index for a linearly polarized signal propagating through the fiber whose polarization vector is parallel (perpendicular) to the major axis of the elliptical cladding (plane of the stress rods), and the term "slow" ("fast") refers to the relative propagation speed of linearly polarized light whose polarization vector is parallel (perpendicular) to the major axis of the elliptical cladding (plane of the stress rods). Hereafter, the absolute angular orientation of a given segment of PM fiber is specified in terms of the angular orientation of its slow axis relative to the transmission axis of the input polarizer. Unless otherwise stated, it is to be assumed that the fiber segments in question are single transverse mode fibers throughout the relevant range of device operating wavelength.

Such fibers are polarization preserving because the signals traveling down the slow and fast axes dephase relative to each other over a length scale of ~1 mm, thereby preventing efficient mode coupling that would otherwise be caused by refractive index perturbations having spatial frequencies greater than ~1 mm. The degree of process control attainable in practice during the fabrication of real-world fibers is such that the vast majority index perturbations have spatial frequencies much longer than a millimeter. Stated another way, in a conventional non-polarizing fiber, index variations having spatial frequencies much larger than 1 mm are responsible for the vast majority of polarization scrambling observed. As a result of inefficient mode coupling between the fast and slow axes of a PM fiber, in the absence of nonlinear effects, the signal components launched into the fiber that are polarized parallel to the fast and slow axes propagate independently and can be analyzed as such.

Figure 2:
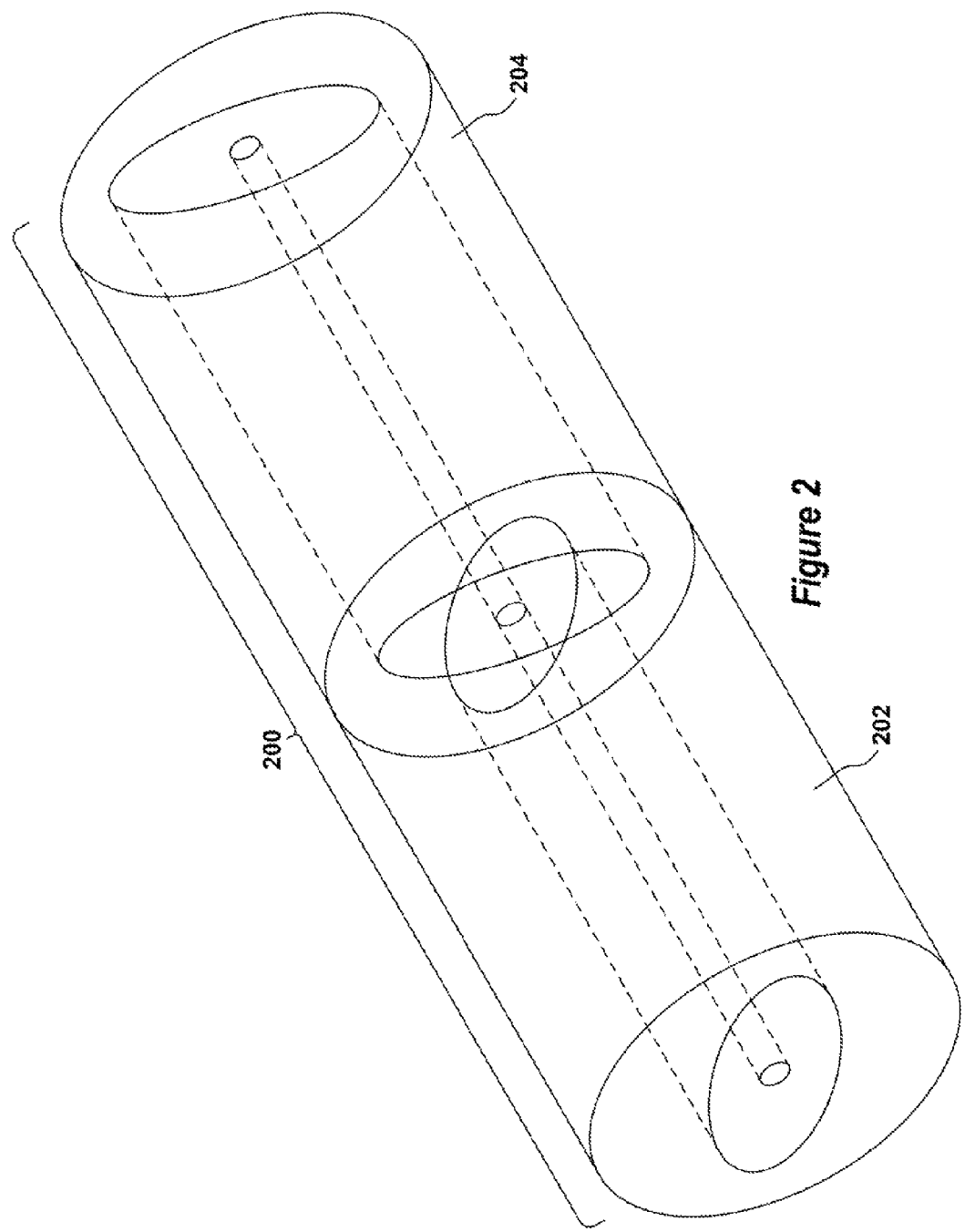
FIG. 2 is an isometric view of an example of a structure having substantially zero net retardation, substantially independent of signal wavelength and ambient temperature, including two wave plates having substantially equal retardation and disposed in a substantially mutually perpendicular orientation.

FIG. 2 is an isometric view of a structure 200 having substantially zero net retardation constructed from two of the wave plates 100 shown in FIG. 1. The structure 200 includes an entry wave plate 202 and an exit wave plate 204 having substantially equal retardations. The slow and fast axes of the entry wave plate 202 are oriented substantially perpendicular to the corresponding slow and fast axes of the exit wave plate 204. Using conventional nomenclature, such a structure may be referred to as a "zero-order, zero-wave plate." Zero-order, zero-wave plates are typically not encountered in optics because in principle they perform no optical function. In the absence of nonlinear effects, such a device performs a null operation on the polarization state of any input signal passing therethrough. In other words, there is no change in the polarization state because there is no net retardation. The signal component that travels along slow axis of entry wave plate 202 travels along the fast axis of the exit wave plate 204, and the signal component that travels along fast axis of entry wave plate 202, travels along the slow axis of the exit wave plate 204. The transit time for both signal components is therefore substantially identical. A linearly polarized signal injected into a zero-order, zero-wave plate therefore experiences substantially no change in polarization state.

The distinction between a zero-wave plate and a zero-order, zero-wave plate is as follows. The term zero-wave plate pertains to any structure in which the net difference in optical path length (distance×index of refraction) for light polarized along the fast and slow axes is an integral number of wavelengths. For example, an $N^{th}$-order zero wave plate would have a net difference in optical path length of $\Delta n\, L = N\, \lambda$, where $\Delta n$ is the birefringence of the wave plate material, L is the length of the wave plate along the axis of signal propagation, N is an integer, and $\lambda$ is the wavelength of the optical signal. A signal component traversing the wave plate polarized along the slow axis experiences a phase retardation of $2\pi N$ radians relative to a signal component polarized along the fast axis. In general, wave plates are not achromatic devices, for two reasons. The first reason pertains to the wavelength dependence of the equation $\Delta n\, L = N\, \lambda$. For example, an optical path length difference of 10 μm represents a retardation of exactly 10λ at a wavelength of 1000 nm, but 10.20λ at a wavelength of 980 nm. In this case the net retardation would be zero radians for signal components at 1000 nm, but 1.3 (0.20×2π) radians for signal components at 980 nm. A further consideration is that the birefringence, $\Delta n$, for a given material and/or waveguide structure typically varies as a function of wavelength.

As mentioned above, an $N^{th}$-order wave plate can be constructed from a single length of birefringent material for which $\Delta n\, L = N\, \lambda$. But an $N^{th}$-order wave plate can also be constructed by placing two lengths of birefringent material having mutually perpendicular fast (slow) axes in series, for which $\Delta n_1\, L_1 - \Delta n_2\, L_2 = N\, \lambda$. This makes it possible to construct a zero-order, zero-wave plate of non-zero length (by having $\Delta n_1\, L_1 = \Delta n_2\, L_2$). If the two lengths of birefringent material comprising such a zero-order, zero-wave-plate structure each have an identical wavelength dependence for $\Delta n$, or if the two lengths of birefringent material comprising such a structure are each fabricated from the same birefringent material, the net retardation of such a wave plate will be zero radians, independent of wavelength. If the two lengths of birefringent material comprising such a zero-order, zero-wave-plate structure have an identical temperature dependence for $\Delta n\, L$ (dictated by the thermal expansion coefficient of the fiber materials, including the stress applying element(s), and the effective value of dn/dT for in mode field region of the fiber), or if the two lengths of birefringent material comprising such a structure are simply fabricated from the same birefringent material, the net retardation of such a wave plate will be zero radians, independent of changes in ambient temperature.

Therefore, a zero-order, zero-wave-plate constructed from nominally equal lengths of nominally identical PM fiber has the following desirable properties for various embodiments described herein. The use of PM fiber eliminates the polarization scrambling effects normally associated with non-polarization-maintaining fiber. In the absence of nonlinear effects, a zero-wave plate performs a null operation on the polarization state of any input signal. A compound structure comprising two mutually perpendicular segments of nominally equal length and nominally identical PM fiber further enables the construction of a zero-order, zero-wave plate, wherein the above null property is substantially independent of wavelength and ambient temperature. In addition, unlike a single wave plate structure, a two-wave-plate structure enables the construction of a zero-order, zero-wave plate having non-zero length. In fact, such a two-wave-plate structure can be made arbitrarily long provided that it is constructed from two pieces of nominally identical fiber of substantially equal length. The use of substantially non-zero lengths of fiber optic waveguide enables the generation of substantial self-phase modulation ("SPM") and cross-phase modulation ("XPM") by high-peak-power pulsed optical signals. As described herein, the interaction of these two nonlinear effects can be used to advantageously alter the polarization of high-peak-power signals, and the substantial absence of SPM and XPM generated by low peak-power-power signals leaves the polarization state of such signals significantly unaltered.

Figure 3:
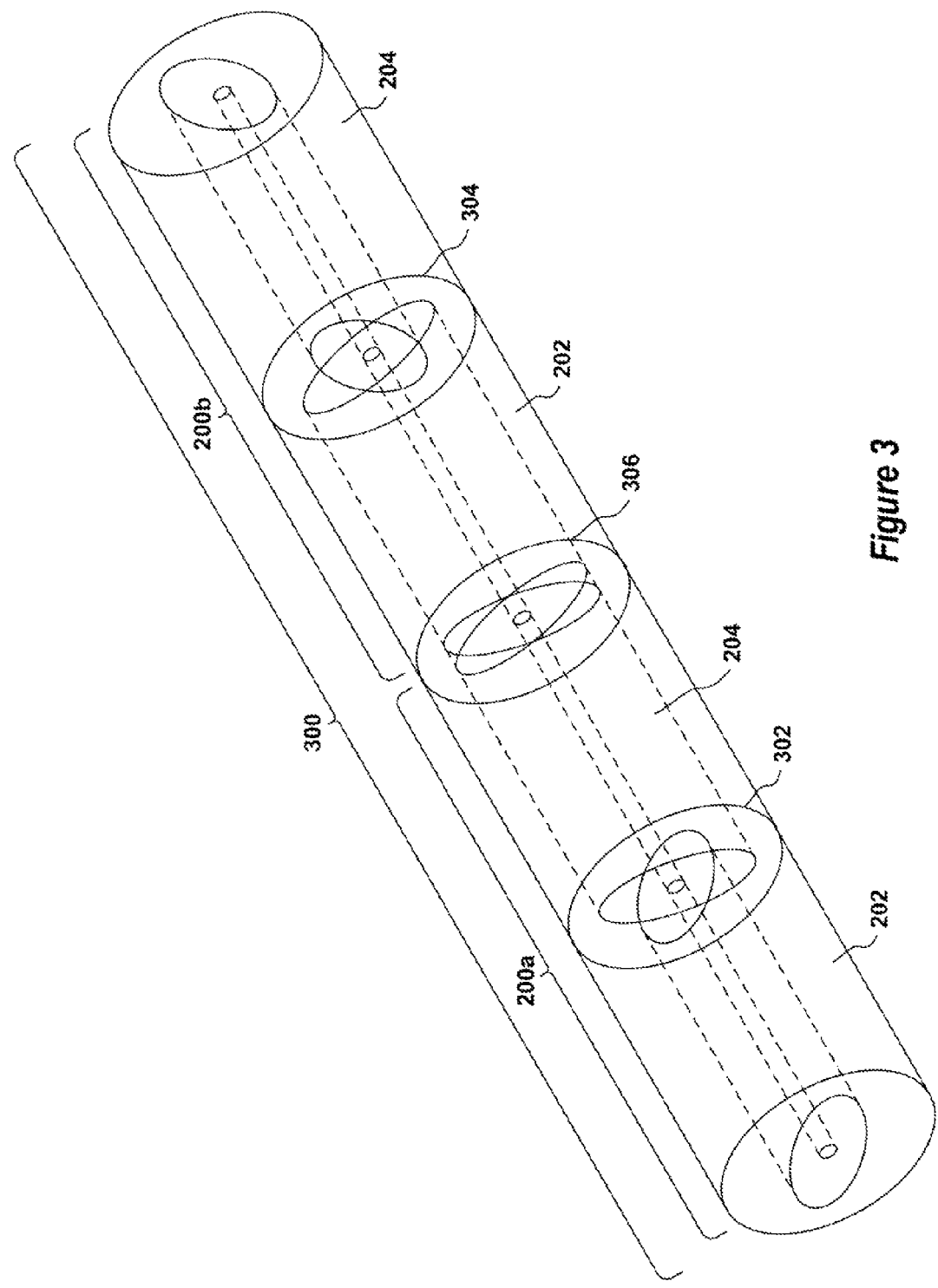
FIG. 3 is an isometric view of an embodiment of a four-wave-plate structure having substantially zero net retardation, substantially independent of signal wavelength and ambient temperature, including a pair of the zero-order, zero-wave-plate structures shown in FIG. 2 disposed in a specified relative angular orientation.

IV. Embodiments of Invention Directed to Wave-Plate Structures and Power Selective Optical Filter Devices FIG. 3 is an isometric view of an embodiment of a four-wave-plate structure 300 having substantially zero net retardation, substantially independent of signal wavelength and ambient temperature, comprising a pair of the substantially zero-order, zero-wave-plate structures 200a and 200b shown in FIG. 2, disposed in a specified relative angular orientation. As depicted in FIG. 3, a relative angle 302 between the slow axis of the entry wave plate 202 and the slow axis of the exit wave plate 204 of the first substantially zero-order, zero-wave plate 200a is substantially equal to 90°. A relative angle 304 between the slow axis of the entry wave plate 202 and the slow axis of the exit wave plate 204 of the second substantially zero-order, zero-wave plate 200b is also substantially equal to 90°. A relative angle 306 between the slow axis of the exit wave plate 204 of the first substantially zero-order, zero-wave plate 200a and the slow axis of the entry wave plate 202 of the second substantially zero-order, zero-wave plate 200b is about 40° to about 50°, more specifically about 43° to about 47°, and even more specifically about to about 45°.

Some or all of the entry and exit wave plates 202 and 204 of the first and second substantially zero-order, zero-wave plates 200a and 200b may be constructed from one or more PM fiber segments and such PM fiber segments may be fusion spliced together to form an integral fiber structure. In other embodiments, the one or more PM fiber segments may comprise polarization maintaining fiber specifically designed to have high optical nonlinearity. For example, such high nonlinearity fiber may be fabricated through the use of specific co-dopants such as $GeO_2$ and $Bi_2O_3$, the use of high-numerical-aperture, small-mode-field-area fiber structures, the use polarization maintaining fiber reduced in diameter by stretching and/or tapering, and/or the use of micro-structured fibers (e.g. holey fibers, photonic bandgap fibers, photonic crystal fibers). A conventional polarization maintaining fiber has a nonlinear coefficient $\gamma$ of order $5 \times 10^{-3}$ $W^{-1}$ $m^{-1}$.

$$\gamma = \frac{2\pi n_2}{\lambda A_{\it{eff}}}$$

In the above equation, $n_2$ is the effective nonlinear refractive index for light propagating in the fiber core (~$2.6 \times 10^{-20}$ $m^2$ $W^{-1}$ for fused silica), $\lambda$ is the signal wavelength, and $A_{\it{eff}}$ is the effective mode-field area of the of the fiber. $\gamma$ can be thought of as the number of radians of nonlinear phase shift (due to self-phase modulation) per Watt-meter. For example, for a typical silica core polarization maintaining fiber having a mode-field diameter of 6.0 μm at $\lambda$=1000 nm:

$$\gamma = \frac{2\pi(2.6 \times 10^{-20} \, m^2 \, W^{-1})}{(1.0 \times 10^{-6} \, m)\left[\frac{\pi}{4}(6.0 \times 10^{-6} \, m)^2\right]} = 5.8 \times 10^{-3} \, W^{-1} \, m^{-1}$$

Specialty high-nonlinearity fibers have been fabricated with values of $\gamma$ is excess of 1 $W^{-1}$ $m^{-1}$; a 1-Watt input signal transmitted through a 1-meter-long segment of such high nonlinearity fiber may generate a nonlinear phase shift of order 1 radian.

In other embodiments, the one or more of PM fiber segments may incorporate a photosensitive core (e.g. $GeO_2$-doped). This may allow the optical path length of one or fiber segments to be adjusted following device fabrication by UV irradiation. Such a technique may facilitate the fabrication of zero-order, zero-wave plates having extremely precise optical path lengths and/or be used to compensate for limitations imposed by certain fabrication methodologies.

Figure 6:
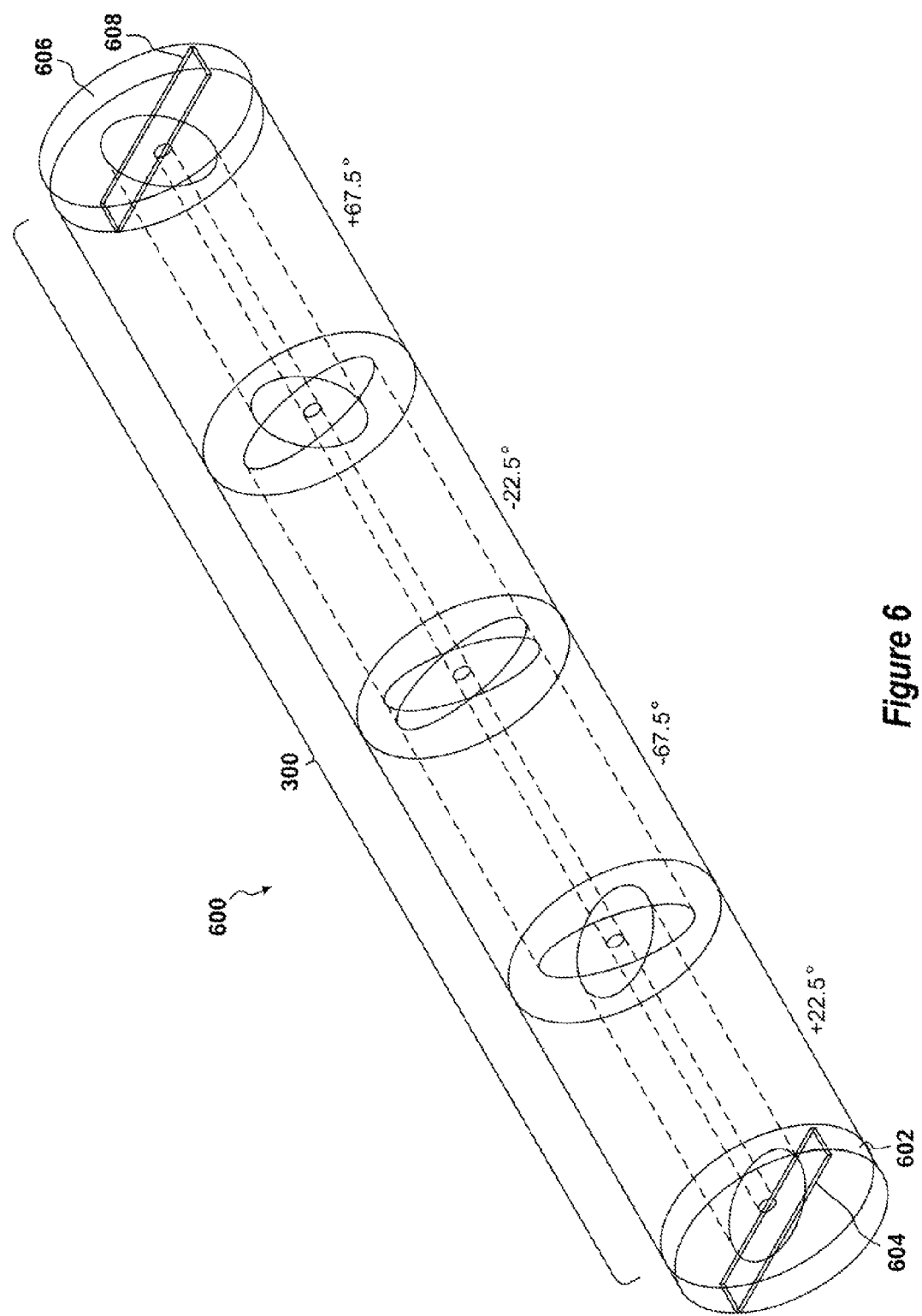
FIG. 6 is an isometric view of an embodiment of a power selective optical filter device configured as an optical limiter structure that substantially attenuates high-peak-power optical signals while allowing low-peak-power optical signals to pass therethrough including the four-wave-plate structure shown in FIG. 3 sandwiched between and disposed in a specified angular orientation relative to a pair of linear polarizers having substantially mutually parallel transmission axes.

For example, the four-wave-plate structure 300 shown in FIG. 3 may configured as shown in FIG. 6 (which is discussed in more detail hereinbelow) wherein the input signal is a cw source of white light (e.g. a light source having a smooth, continuous, spectral distribution spanning hundreds of nanometers), and the output signal is connected to an optical spectrum analyzer. To the extent that the four-wave-plate structure deviates from an ideal zero-order, zero-wave plate, the output spectrum of the white light source will appear amplitude modulated in wavelength on the optical spectrum analyzer (because the structure comprising the "unbalanced" four-fiber-structure and pair of polarizers functions as a crude birefringent filter). Iterative exposure of one or more of the fiber PM fiber segments to UV light may then be used for in situ adjustment of optical path length until the above amplitude modulation is reduced to substantially zero. In an embodiment, a near-UV source (for example, at ~330 nm) may be used to expose the photosensitive core region through the fiber jacket, thereby eliminating any need to strip the fiber.

Such a technique may also be useful for in situ adjustment of optical path length in applications in where the four-fiber assembly is subject to a large longitudinal temperature gradient. More generally, any method or combination of methods for optical path length adjustment may be used to pre-compensate or post-compensate for any effect(s) that would otherwise degrade device performance (e.g., extinction ratio) during operation of such a device.

In a further embodiment, fiber polishing, lapping, grinding, machining, tapering, stretching, bending, or combinations of the foregoing may be used to adjust the optical path length of one or more fiber segments after fabrication. In a further embodiment, one or more heating elements may be incorporated into the four-fiber assembly forming the four-wave-plate structure 300 to adjust the optical path length and/or birefringence of one or more fiber segments. In a further embodiment, one or more mechanisms for controlled application of mechanical stress are incorporated into the four-fiber assembly to adjust the optical path length and/or birefringence of one or more fiber segments.

In another embodiment, the four-wave-plate structure 300 may be fabricated from double-clad or multi-clad fiber polarization maintaining fiber. Such a structure may allow transmission of pump light through the four-wave-plate structure 300.

In another embodiment, a portion or all of the four-wave-plate structure 300 may be created by irradiation, thermal poling, electric field poling, magnetic field poling of one or more optical materials, or combinations of the foregoing.

In another embodiment, the generation of SRS may be suppressed in the four-wave-plate structure 300 by incorporating one or more dopants that absorb strongly over the wavelength range for the first-order and/or higher-order Stokes lines for SRS. In another embodiment, the generation of SRS may be suppressed in the four-fiber assembly 300 by incorporating one or more fiber Bragg gratings (e.g. a long-period fiber Bragg grating) that interferes with propagation of first-order and/or higher-order Stokes lines for SRS. In another embodiment, the generation of SRS in a laser system incorporating one or more of the four-wave-plate structures 300 may be suppressed by the addition of separate optical components and/or modification of such a laser system architecture so as to attenuate or otherwise discriminate against the propagation of signals associated with first-order and/or higher-order SRS.

In other embodiments, the entry and exit wave plates 202 and 204 of the substantially zero-order, zero-wave-plate structures 200a and 200b illustrated in FIG. 3 as one or more of PM fiber segments may be replaced with bulk (i.e., non-fiber) birefringent optical elements. For example, the bulk non-fiber birefringent optical elements may exhibit the same or similar birefringence and nonlinear optical characteristics as the PM optical fibers to form any of the power selective optical filter devices described herein.

Figure 4:
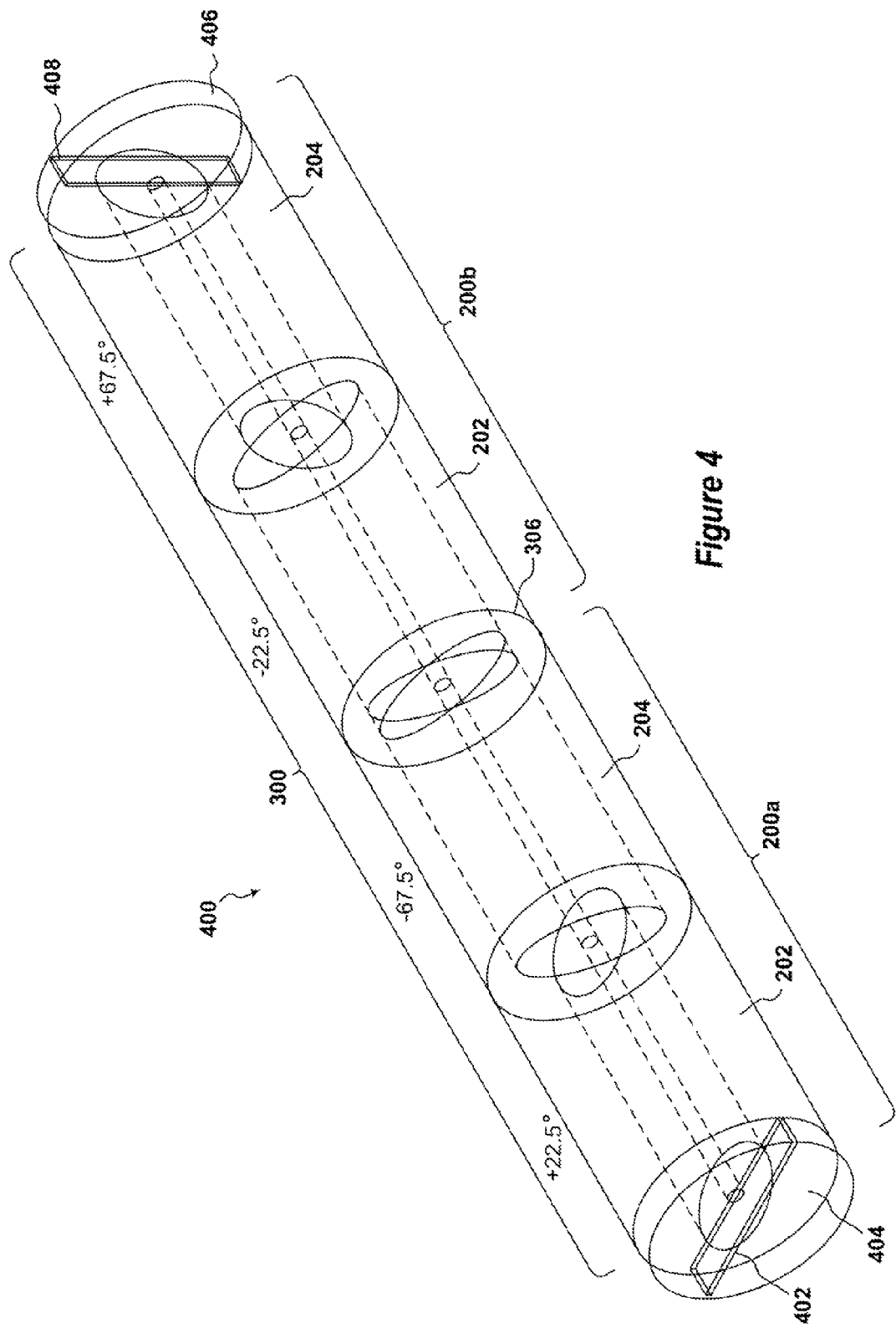
FIG. 4 is an isometric view of an embodiment of a power selective optical filter device configured as an optical switch structure that substantially attenuates low-peak-power optical signals while allowing high-peak-power optical signals to pass therethrough including the four-wave-plate structure shown in FIG. 3 sandwiched between and disposed in a specified angular orientation relative to a pair of linear polarizers having substantially mutually perpendicular transmission axes.

FIG. 4 is an isometric view of an embodiment of a power selective optical filter device 400, comprising the four-wave-plate structure 300 shown in FIG. 3, configured to substantially attenuate low-peak-power optical signals while allowing high-peak-power optical signals to pass therethrough. Thus, the power selective optical filter 400 may also be referred to herein as an optical switch structure. The four-wave-plate structure 300 is sandwiched between and disposed in a specified angular orientation relative to a linear input polarizer 402 having a transmission axis 404 and a linear output polarizer 406 having a transmission axis 408 oriented substantially perpendicular to the transmission axis 404. The respective angular orientations of each of the four wave plate slow axes of the individual entry and exit wave plates 202 and 204 relative to the transmission axis 404 of the input polarizer 402 are substantially equal to +22.5°, −67.5°, −22.5°, and +67.5°, respectively.

The input polarizer 402 receives, for example, an input signal of randomly polarized light, elliptically polarized, circularly polarized, or linearly polarized from an optical source (e.g., an optical fiber amplifier or seed laser) and is configured to selectively transmit at least a portion of the input signal as linearly polarized light therethrough. For example, when the input signal is randomly polarized, elliptically polarized, or circularly polarized, the transmitted intensity of the input signal is attenuated because only a component of the time-varying electric field of the input signal is substantially parallel to the transmission axis 404 of the input polarizer 402, while when the input signal is linearly polarized with its time-varying electric field substantially parallel to the transmission axis 404 of the input polarizer 402, substantially all of the input signal is allowed to pass therethrough.

The four-wave-plate structure 300 is positioned to receive a linearly polarized input signal transmitted through the input polarizer 402. Some or all of the various polarizers (402 and 406) and wave plates (202 and 204) may be fusion spliced together. The four-wave-plate structure 300 is configured to alter the polarization state of the linearly polarized input signal in a manner that depends on the power of the linearly polarized input signal. As will be discussed in more detail hereinbelow, when the linearly polarized input signal is at a sufficiently high power, the four-wave-plate structure 300 converts the linearly polarized input signal to a substantially perpendicular linear polarization state (i.e. aligned with the transmission axis 408 of the output polarizer 406). When the linearly polarized input signal is at a relatively lower power, the four-wave-plate structure 300 may insignificantly alter the polarization state of the linearly polarized input signal to an elliptical polarization state. As the power of the linearly polarized input signal increases, the magnitude of the component of the time-varying electric field of the linearly polarized input signal that is projected onto the transmission axis 408 of the output polarizer 406 becomes increasingly greater. If the power of the input signal is made large enough, the polarization state of the linearly polarized input signal is substantially rotated by about 90 degrees, thereby allowing substantially all of the input signal power to be transmitted through the output polarizer 406.

The power selective optical filter device 400 is also bi-directional. For example, the orientation of the input polarizer 402 in FIG. 4 may be denoted as horizontal (0°) and the orientation of the output polarizer 44 may be denoted as vertical) (±90°). The net transmittance as a function of optical power for a horizontally polarized optical signal incident on the input polarizer 402, and later emerging from the output polarizer 406, is substantially equal to the to net transmittance as a function of optical power for a vertically polarized optical signal incident on the output polarizer 406, and later emerging from the input polarizer 402.

Figure 5A:
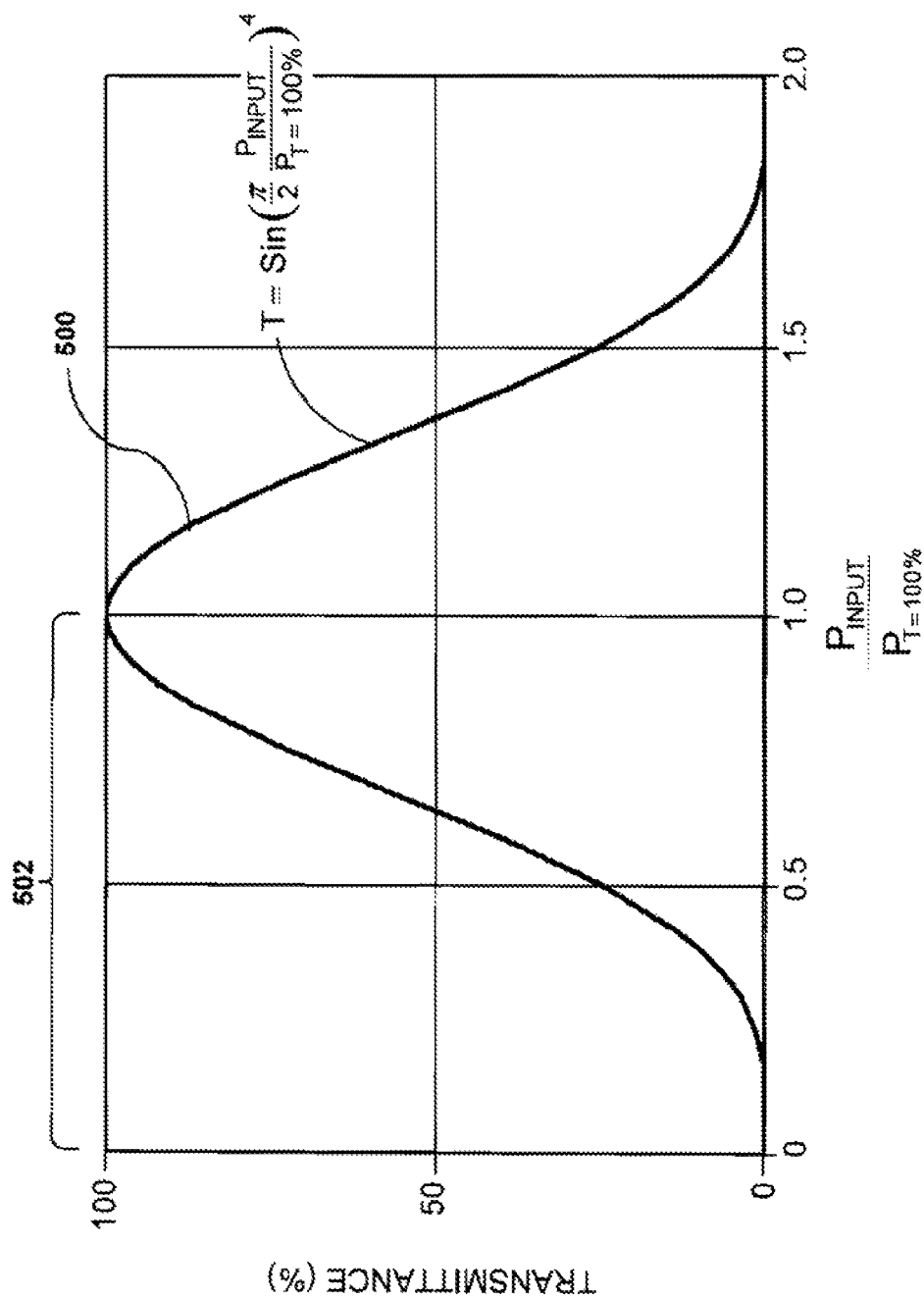
FIGS. 5a and 5b are graphs of the power-dependent transmittance of the optical switch structure shown in FIG. 4, according to an embodiment, as a function of power for an injected linearly polarized signal.

FIG. 5a is a graph 500 of the transmittance (T) of the power selective optical filter device 400 shown in FIG. 4 according to an embodiment. The transmittance (T) of the optical filter device 400 can be described by:

$$T = \text{Sin}^4\left[\frac{\pi P_{input}}{2P_{T=100\%}}\right]$$

where $P_{input}$ is the power of the linearly polarized signal received by the four-wave-plate structure 300, and $P_{T=100\%}$ is a constant that is the value of $P_{input}$ for which the transmittance (T) first reaches substantially 100 percent. In the limit of low input power, where nonlinear effects such as self-phase modulation and cross phase modulation are negligible, the four-wave-plate structure 300 functions as a conventional zero-order, zero-wave plate that does not significantly alter the polarization state of the input signal. As mentioned earlier, this low-power null property is substantially independent of signal wavelength and ambient temperature. As the power ($P_{input}$) of the linearly polarized input signal is increased beyond $P_{T=100\%}$, the polarization state of the signal impinging on the output polarizer 406 is no longer linear and aligned with the transmission axis 408 of the output polarizer 406, but rather becomes increasingly elliptical with increasing power. Accordingly, the transmittance of the power selective optical filter 400 decreases.

Referring again to FIG. 3 and FIG. 4, the structure and functioning of the four-wave-plate structure 300 and the power selective optical filter 400 will now be described in more detail. In the four-wave-plate structure 300, the first substantially zero-order, zero-wave plate 200a includes the entry wave plate 202 shown as a first "entry" segment of PM fiber and the exit wave plate 204 shown as a second "exit" segment of PM fiber connected in series so that the transverse orientations of the slow axes of the entry and exit wave plates 202 and 204 are substantially perpendicular. In the four-wave-plate structure 300, the second substantially zero-order, zero-wave plate 200b includes the entry wave plate 202 shown as a third "entry" segment of PM fiber and the exit wave plate 204 shown as a fourth "exit" segment of PM fiber connected in series so that the transverse orientations of the slow axes of the entry and exit wave plates 202 and 204 are substantially perpendicular.

Referring specifically to FIG. 4, the orientation of the first and second substantially zero-order, zero-wave plates 200a and 200b are now specified in terms of the slow-axis angular orientation of their respective entry wave plates 202 relative to the transmission axis 404 of the input polarizer 402. In an embodiment, the slow axis of the entry wave plate 202 of the first substantially zero-order, zero-wave plate 200a is oriented at an entry-wave-plate angle of θ relative to the transmission axis 404 of the input polarizer 402, and the slow axis of the entry wave plate 202 of the second substantially zero-order, zero-wave plate 200b is oriented at a substantially equal and opposite entry-wave-plate angle (−θ) relative to the transmission axis 404 of the input polarizer 402.

In further embodiments, θ=Θ±δ, where Θ=22.5°, and 0°≦δ≦5°. The parameter Θ can be thought of the ideal or target value for θ, and the parameter δ represents deviations from Θ (e.g. because of manufacturing tolerances). Likewise, in further embodiments, the orientation of the slow axis of the entry wave plate 202 of the second substantially zero-order, zero-wave plate 200b relative to the transmission axis 404 of the input polarizer 402 is in the range of about −Θ±δ, with 0°≦δ≦5°.

Figure 5B:
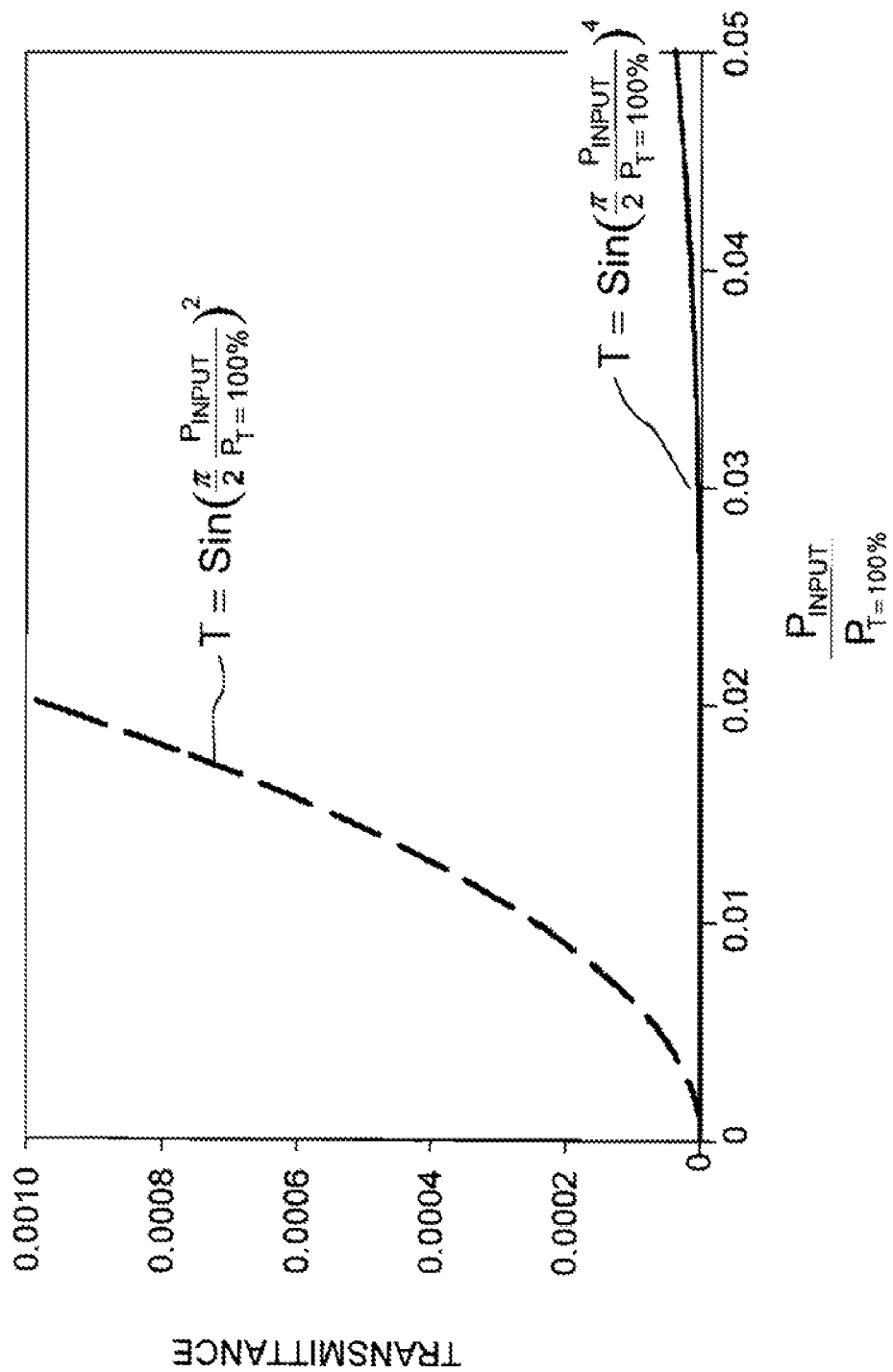

To the extent that one or both zero-wave plate orientations deviate from the above specifications, the transmittance behavior for the optical filter device 400 may deviate from the transmittance behavior shown in the graphs of FIG. 5a and FIG. 5b. For example, as the wave-plate angle θ departs from 22.5 degrees, secondary maxima may be introduced into the transmission curve, and the maximum transmittance may decrease to substantially less than one hundred percent.

In the illustrated embodiment shown in FIG. 4, the entry and exit wave plates 202 and 204 of the first substantially zero-order, zero-wave plate 200a are first and second PM optical fibers, and the product of the fiber birefringence and fiber length (Δn L) is approximately equal for the first and second PM fibers. For example, the product of the fiber birefringence and fiber length for the first and second PM fibers may be equal to each other or differ by for example, 1 percent to about 10 percent. In the illustrated embodiment shown in FIG. 4, the entry and exit wave plates 202 and 204 of the second substantially zero-order, zero-wave plate 200b are third and fourth PM fibers, which also exhibit approximately values of Δn L. For example, Δn L for the third and fourth PM fibers may be equal to each other or differ by, for example, 1 percent to about 10 percent. In some embodiments, the first, second, third, and fourth optical fibers may have substantially the same value of Δn L. For example, to facilitate forming the first, second, third, and fourth optical fibers with substantially the same value of Δn L, the first, second, third, and fourth PM fibers may be fabricated from substantially equal lengths of fiber cut from the same spool of PM fiber.

In one or more embodiments, the product of the nonlinear coefficient and fiber length (γ L) of each of the first, second, third, and fourth PM fibers may be substantially equal to each other or differ by, for example, 1 percent to about 10 percent. The product of the nonlinear coefficient and fiber length (γ L) is indicative of the extent to which an optical fiber segment generates nonlinear optical effects, such as self-phase modulation or cross-phase modulation.

An explanation of how nonlinear optical effects that occur inside a zero-order, zero-wave plate act to alter the polarization state of a linearly polarized input signal is described below. Referring to the first substantially zero-order, zero-wave plate 200 shown in FIG. 2, when a linearly polarized signal is incident at high power, the polarization state of the linearly polarized signal undergoes a significant change through the combined effects of self-phase modulation ("SPM") and cross-phase modulation ("XPM"). Because the PM optical fibers forming the entry and exit wave plates 202 and 204 are polarization maintaining, a linearly polarized signal injected, for example, along the slow axis of the entry wave plate 202 will emerge linearly polarized along the fast axis of the exit wave plate 204 with substantially no change in its polarization state. The electric field component of the linearly polarized signal that is oriented along the slow optical axis of the entry wave plate 202 and the fast optical axis of the exit wave plate 204 is referred to herein as the "sf" (slow/fast) polarization component. The electric field component of the linearly polarized signal that is oriented along the fast optical axis of the entry wave plate 202 and the slow optical axis of the exit wave plate 204, is referred to herein as the "fs" (fast/slow) polarization component. The change in refractive index due to nonlinear phase shift through the combined effects of SPM and XPM on the electric field components $E_x$ and $E_y$ is:

$$\Delta n_{Ex} = \varepsilon_o c n_2 \left( \langle E_x^2 \rangle + \frac{2}{3} \langle E_y^2 \rangle \right)$$

$$\Delta n_{Ey} = \varepsilon_o c n_2 \left( \frac{2}{3} \langle E_x^2 \rangle + \langle E_y^2 \rangle \right)$$

In the above equations, x and y denote the horizontal and vertical transverse coordinates of an xyz coordinate system in which the signal in the fiber core propagates along the z axis, $\varepsilon_o$ is the permittivity of free space, c is the speed of light, $n_2$ is the nonlinear index of refraction of the PM fiber material (dependent on core and cladding composition), and $\langle E^2 \rangle$ denotes the time-averaged value of $E^2$ over one optical cycle.

If a linearly polarized signal is incident upon the entry wave plate 202 at a polarization angle of θ with respect to the x-axis, the fraction of power polarized along the sf axis is Cos[θ]², and the fraction of power polarized along the fs axis is Sin[θ]². The signal components polarized along the sf and fs axes therefore experience index changes of:

$$\Delta n_{sf} = \varepsilon_o c n_2 \langle E_2 \rangle \left( \text{Cos}[\theta]^2 + \frac{2}{3} \text{Sin}[\theta]^2 \right)$$

$$\Delta n_{fs} = \varepsilon_o c n_2 \langle E^2 \rangle \left( \frac{2}{3} \text{Cos}[\theta]^2 + \text{Sin}[\theta]^2 \right)$$

where, θ, as previously discussed, denotes the orientation of the slow axis of the entry wave plate 202 relative to the x (horizontal) axis. Subtracting the above equations yields a net nonlinear birefringence for the first substantially zero-order, zero-wave plate 200 of:

$$\Delta \Delta n = \frac{1}{3} \varepsilon_o c n_2 \langle E^2 \rangle \text{Cos}(2\theta)$$

Therefore, two equal lengths of PM optical fiber spliced together to form the structure 200 with the slow optical axis of one of the PM optical fibers oriented substantially parallel to the fast optical axis of the other one of the PM optical fibers function as a wave plate in which the net birefringence thereof depends on $\langle E^2 \rangle$ (i.e., the power of the linearly polarized input signal). In the limit of a low power input signal, $\langle E^2 \rangle = 0$, the net birefringence of this two-fiber structure is nominally zero.

Referring to FIG. 4, the transmittance (T) for the power selective optical filter device 400 may be determined by taking the product of the Jones Matrix for the input polarizer 402, the four-wave-plate structure 300, and the output polarizer 406. For light propagating down the +z axis of an xyz coordinate system, the Jones Matrix for a single wave plate ("WP") of retardation φ whose slow axis oriented at is oriented at an angle θ with respect to the x axis is:

$$J_{WP}(\phi, \theta) = \begin{pmatrix} J_{xx} & J_{xy} \\ J_{yx} & J_{yy} \end{pmatrix}$$

$$= \begin{pmatrix} \cos\left(\frac{\phi}{2}\right) - i\sin\left(\frac{\phi}{2}\right)\cos(2\theta) & -i\sin\left(\frac{\phi}{2}\right)\sin(2\theta) \\ -i\sin\left(\frac{\phi}{2}\right)\sin(2\theta) & \cos\left(\frac{\phi}{2}\right) + i\sin\left(\frac{\phi}{2}\right)\cos(2\theta) \end{pmatrix}$$

In the limit of low input power, nonlinear effects are substantially zero, in which case the first substantially zero-wave, zero-order wave plate 200a acts like a wave plate having no net retardation ($\phi$=0). It's Jones Matrix is therefore:

$$J_{200_a} = J_{WP}(0, \theta) = \begin{pmatrix} 1 & 0 \\ 0 & 1 \end{pmatrix}$$

Thus, at low input power the first substantially zero-order, wave plate 200a performs a null operation on the optical signal; there is no change in the polarization state for light passing through the device. As mentioned earlier, a very important point is that this null property may be substantially independent of wavelength and ambient temperature. This makes it possible to construct a power selective optical filter whose extinction ratio is substantially constant as a function of wavelength and temperature. This is in marked contrast to a variety of other optical devices that may only provide high extinction ratio over a relatively narrow range of wavelengths (e.g. Faraday isolators), and/or temperature range.

At higher input power, the effective birefringence due to optical nonlinearity:

$$\Delta\Delta n = \frac{1}{3}\varepsilon_o c n_2 \langle E^2 \rangle \cos(2\theta) = \frac{n_2 \cos(2\theta) P_{input}}{3 A_{eff}}$$

becomes non-negligible, and over a length of fiber L, generates a net optical retardation of:

$$\phi = \frac{n_2 P \cos(2\theta) L}{3 \lambda A_{eff}}$$

In the above equations, $\theta$ is the angular orientation of the slow axis of the entry wave plate 202 of the first zero-order, zero-wave plate 200a, $\lambda$ is the wavelength of the optical signal, $P_{input}$ is the power of the optical signal transmitted through input polarizer 402, and $A_{eff}$ is the effective mode field area of the fiber. The second substantially zero-wave plate 200b functions in an analogous manner.

Referring now to the power selective optical filter device 400 as a whole (FIG. 4), for a horizontally polarized signal passing through the input polarizer 402, the state of polarization ("SOP") of the signal that emerges from the vertically oriented output polarizer 406 is:

$$SOP = J_{VerticalPolarizer} \cdot J_{2ndZOZWP} \cdot J_{1stZOZWP} \cdot E_{HorizontallyPolarizedSignal}$$

$$SOP = \begin{pmatrix} 0 & 0 \\ 0 & 1 \end{pmatrix} \cdot J_{200_b}(\phi_{200_b}, -\theta) \cdot J_{200_a}(\phi_{200_a}, +\theta) \cdot \begin{pmatrix} 1 \\ 0 \end{pmatrix}$$

$$SOP = \begin{pmatrix} 0 \\ \sin(4\theta)\sin\left(\frac{\pi n_2 P_{input} L}{6\lambda A_{eff}}\cos(2\theta)\right)^2 \end{pmatrix}$$

where the subscript "ZOZWP" denotes "zero-order, zero-wave plate", and L is the combined length of the first, second, third and fourth PM fiber segments forming the individual entry and exit wave plates of the four-wave-plate structure 300.

The transmittance (T) of the power-dependent optical filter device 400 as a whole is therefore:

$$T = \sin(4\theta)^2 \sin\left(\frac{\pi n_2 P_{input} L}{6\lambda A_{eff}}\cos(2\theta)\right)^4$$

For the special case of $\theta$=22.5°:

$$T = \sin\left(\frac{\pi}{2}\frac{P_{input}}{P_{T=100\%}}\right)^4$$

It is convenient to express this equation as:

$$T = \sin\left(\frac{\sqrt{2}\,\pi n_2 P_{input} L}{12\lambda A_{eff}}\right)^4$$

where $P_{T=100\%}$ is the input power at which 100% transmittance is first reached:

$$P_{T=100\%} = \frac{3\sqrt{2}\,\lambda A_{eff}}{n_2 L} = \frac{6\sqrt{2}\,\pi}{\gamma L}$$

Using the value of $\gamma$ provided earlier ($\gamma$=5.8×10$^{-3}$ W$^{-1}$ m$^{-1}$), for a typical PM fiber operating a wavelength of ~1.0 μm, the above equation indicates that a 1-meter-long device would have a threshold of $P_{T=100\%}$=4.6 kW. This figure may be decreased several-fold by simply using PM fiber with a highly GeO$_2$-doped core (e.g. polarization maintaining photosensitive fiber), which is readily available. Using specialty high-nonlinearity fiber ($\gamma$=~1 W$^{-1}$ m$^{-1}$) and/or somewhat longer lengths of fiber, $P_{T=100\%}$ may be lowered to 10 W or less. Using shorter lengths of conventional or low-nonlinearity PM fiber, $P_{T=100\%}$ may be raised to 1 MW or more. Thus, the switching threshold for the power-dependent optical filter devices described herein may be specified over a very wide dynamic range.

The Sin$^4$ transmittance function of the optical filter device 400 may provide for very high extinction ratio compared to a wide variety of other devices that may have a transmittance function of the form Sin$^2$, for example, fiber loop mirrors, and various types of amplitude modulators. This difference is illustrated explicitly in FIG. 5b, and is relevant in applications related to ASE blocking, such as multi-stage fiber amplifier systems.

Note also that T is a periodic function of P. As the input power is increased beyond $P_{T=100\%}$ the transmittance T decreases until it reaches a minimum of substantially zero at an input power of P=2 $P_{T=100\%}$. More generally, the transmittance T is substantially 100% when P=(2 m+1) $P_{T=100\%}$, and the transmittance T is substantially 0% when P=2 m $P_{T=100\%}$, where m=0, 1, 2, 3, etc. In many practical applications of the power-dependent optical filter device 400, only the region 502 ($0 \leq P_{input}/P_{T=100\%} \leq 1$) of FIG. 5a is of relevance.

Thus far, the described embodiments have $\theta = \Theta \pm \delta$, where $\Theta = 22.5°$, and $0° \leq \delta \leq 5°$. Again, $\Theta$ is the ideal or target value for $\theta$, and $\delta$ represents deviations from $\Theta$ (e.g. because of manufacturing tolerances). It should be understood that an equivalent structure can be fabricated under the more general specification:

$$\Theta = \pm(22.5° + n45°)$$

In the above equation n is an integer. Thus, for example, if $\delta=0$, over the range $-180° \leq \theta \leq +180°$, $\theta$ may take on any of the following values: $-157.5°$, $-112.5°$, $-67.5°$, $-22.5°$, $+22.5°$, $+67.5°$, $+112.5°$, $+157.5°$. Referring back to the device transfer function, $$T = \text{Sin}(4\theta)^2 \text{Sin}\left(\frac{\pi n_2 PL}{6\lambda A_{\text{eff}}} \text{Cos}(2\theta)\right)^4$$

the fundamental requirement is that $\theta$ be chosen such that the terms $\text{Sin}(4\theta)$ and $\text{Cos}(2\theta)$ evaluate to:

$$\text{Sin}(4\theta) = \pm 1 \text{ and } \text{Cos}(2\theta) = \pm \frac{\sqrt{2}}{2}$$

For example, we could choose $\theta = -67.5° \pm \delta$, with $0° \leq \delta \leq 5°$, to represent an embodiment equivalent to $\theta = 22.5° \pm \delta$, with $0° \leq \delta \leq 5°$.

Figure 7:
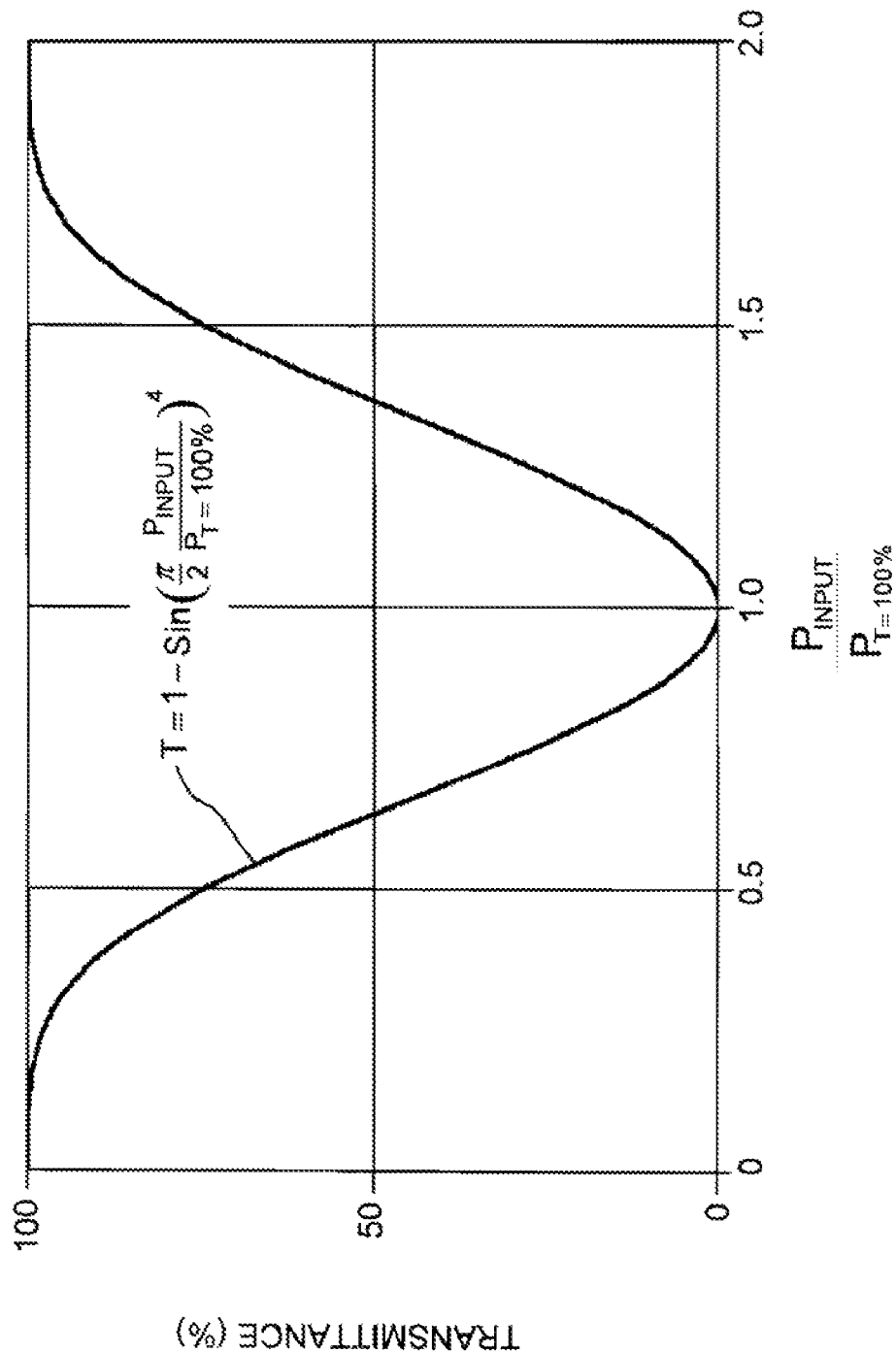
FIG. 7 is a graph of the transmittance of the optical limiter structure shown in FIG. 6, according to an embodiment, as a function of power for the injected linearly polarized signal.

FIG. 6 is an isometric view of an embodiment of a power selective optical filter device 600 configured to substantially attenuate high-peak-power optical signals while allowing low-peak-power optical signals to pass therethrough. Thus, the power selective optical filter 600 is also referred to herein as an "optical limiter structure." The power selective optical filter 600 includes the four-wave-plate structure 300 of FIG. 3, sandwiched between, and disposed in a specified angular orientation relative to a pair of linear polarizers 602 and 606 having substantially mutually parallel transmission axes 604 and 608. When configured as an optical limiter structure, the output polarizer transmission axis 608 is disposed substantially parallel, rather than substantially perpendicular, to the input polarizer transmission axis 604. This is the only structural difference between the optical filter device 600 configured to substantially attenuate higher-power light while allowing lower-power light to pass therethrough, and the optical filter device 400 configured to substantially attenuate lower-power light while allowing higher-power light to pass therethrough. The transmittance of the device 600 as a function of input power in this optical limiter configuration (plotted in FIG. 7) is:

$$T = 1 - \text{Sin}\left(\frac{\pi}{2} \frac{P_{input}}{P_{T=100\%}}\right)^4$$

More generally, in other embodiments the transmission axis of the output polarizer may be set at a specified intermediate angle, neither parallel nor perpendicular to the transmission axis of the input polarizer, to obtain other device transfer functions, such as:

$$T = \text{Sin}\left(\frac{\pi}{2} \frac{P_{input} - P_{T=0\%}}{P_{T=100\%}}\right)^4$$

Figure 8A:
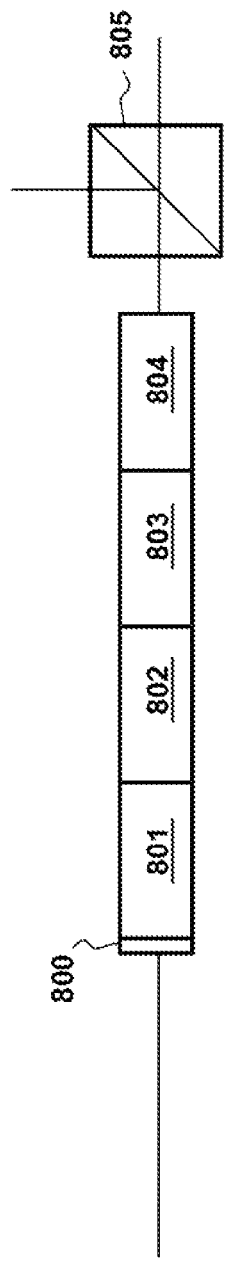
FIG. 8a-8c are schematic side views of device configurations, according to different embodiments, illustrating some of the many different types of polarizers that may used in conjunction with four-wave-plate structure of FIG. 3 to form an optical switch structure or optical limiter structure.
Figure 8B:
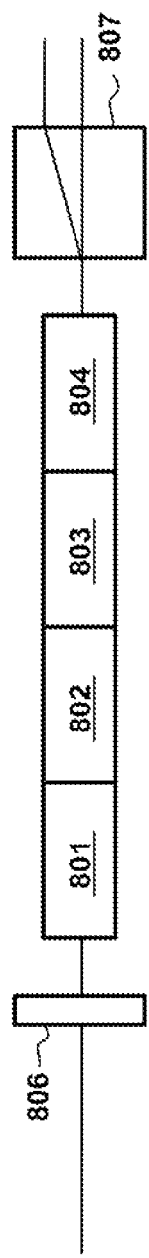
Figure 8C:
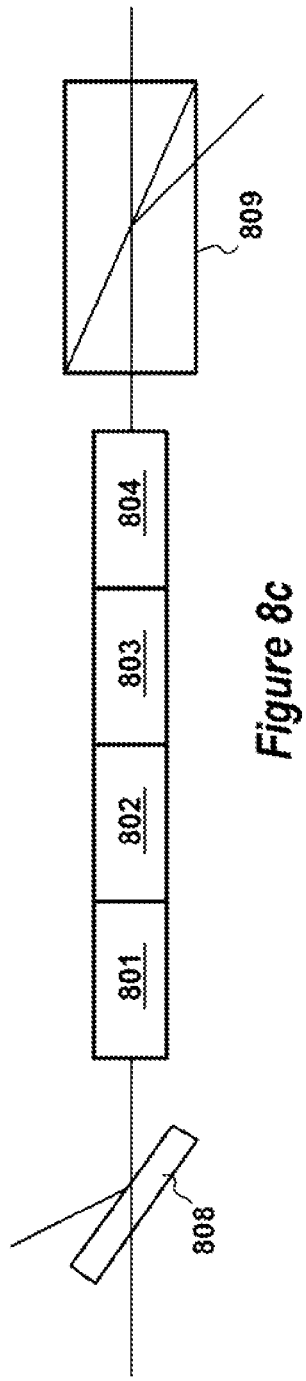

FIG. 8a-8c are a schematic side views of device configurations, according to different embodiments, illustrating some of the many different types of linear polarizers that may used in conjunction with four-wave-plate structure (represented separately in FIG. 3) comprising PM fiber segments 801, 802, 803 and 804 to create an optical switch structure or optical limiter structure. The term "linear polarizer" is used to distinguish against a less common type of polarizing device, the "circular polarizer". Whereas a linear polarizer may be used, for example, to transmit horizontally polarized light while rejecting vertically polarized light, a circular polarizer may be used, for example, to transmit left-hand circularly polarized light while rejecting right-hand circularly polarized light. In the discussion that follows, the term "polarizer" denotes a linear polarizer unless otherwise stated.

There are two main classes of polarizers. The first class of polarizers transmits some or all of an incident signal that is linearly polarized along the transmission axis of the polarizer, and absorbs some or all of an incident signal linearly polarized perpendicular to its transmission axis. Such devices are referred to herein as "absorptive polarizers". The second class of polarizers transmits some or all of an incident signal that is linearly polarized along its transmission axis, but reflects, deflects, or otherwise deviates substantially some or all of an incident signal linearly polarized perpendicular to its transmission axis. Such devices are referred to herein as "non-absorptive polarizers".

Examples of absorptive polarizers include wire grid polarizers, Polaroid film, Polarcor glass manufactured by Corning Inc., and in-fiber polarizers based on evanescent coupling to an embedded metal film, such as those manufactured by General Photonics Inc. Non-absorbing polarizers are commonly used to redirect the non-transmitted portion of an incident signal for use elsewhere, or divert it to an absorbing target that can dissipate a large amount of optical power (e.g., compared to a thin sheet of Polarcor glass). Referring to FIG. 8a, polarizer 800 represents an in-fiber absorptive polarizer. Referring to FIG. 8b, polarizer 806 is also an absorptive polarizer, but in the form of a bulk optical component (e.g. a 1-cm-diameter circular disc of Polarcor glass), rather than a fiber optic component. Polarizers 805, 807, 808, and 809 shown in FIGS. 8a-8c, all represent non-absorptive polarizers. Examples of non-absorptive polarizers include, but are not limited to, Nicol prisms, Wollaston prisms, Glan-Thompson prisms, Glan-Foucault prisms, Glan-Taylor prisms, and Rochon prisms. Referring back to FIG. 4, in various embodiments, one or both of the polarizers 402 and 406 may be replaced by any type of absorbing or non-absorbing polarizer, or combination of absorbing and/or non-absorbing polarizers. As discussed later, where one or more non-absorbing polarizers are used, the diverted beam(s) may be used for a variety of purposes.

In various embodiments, one or both of the polarizer elements of such a power-dependent optical filter may be provided by other optical components, thereby obviating the need for one or both polarizer elements. For example, a polarizing ("PZ") fiber amplifier provides gain for only one polarization state. Such a PZ fiber amplifier may be placed before and/or after one or more of the power-dependent optical filter devices disclosed herein, and in some cases, may eliminate the need for one or both polarizing elements. A number of other optical components perform functions in which the polarization of a signal passing therethrough is either incidental to, or a critical feature of, component function (e.g. non-polarization-independent Faraday isolators). Any such active or passive component having a polarization-dependent transmittance, or any combination of such polarizing components, may be used to augment or replace one or both polarizing elements of the power-dependent optical filter devices disclosed herein.

V. Embodiments of Invention Directed to Optical Systems Incorporating the Disclosed Wave-Plate Structures and Power Selective Optical Filters Several applications of the optical switch structures and optical limiter structures are described with respect to FIGS. 9-19. These applications include, but are not limited to, optical isolation of pulsed laser sources, all-optical switching/gating, actively and passively mode-locked lasers, actively and passively q-switched lasers, temporal pulse shaping and/or clean up, stabilization of cw lasers, improving the extinction ratio of amplitude modulators and other switching devices, amplitude limiting to prevent optical damage, and laser cavity dumping.

Figure 9:
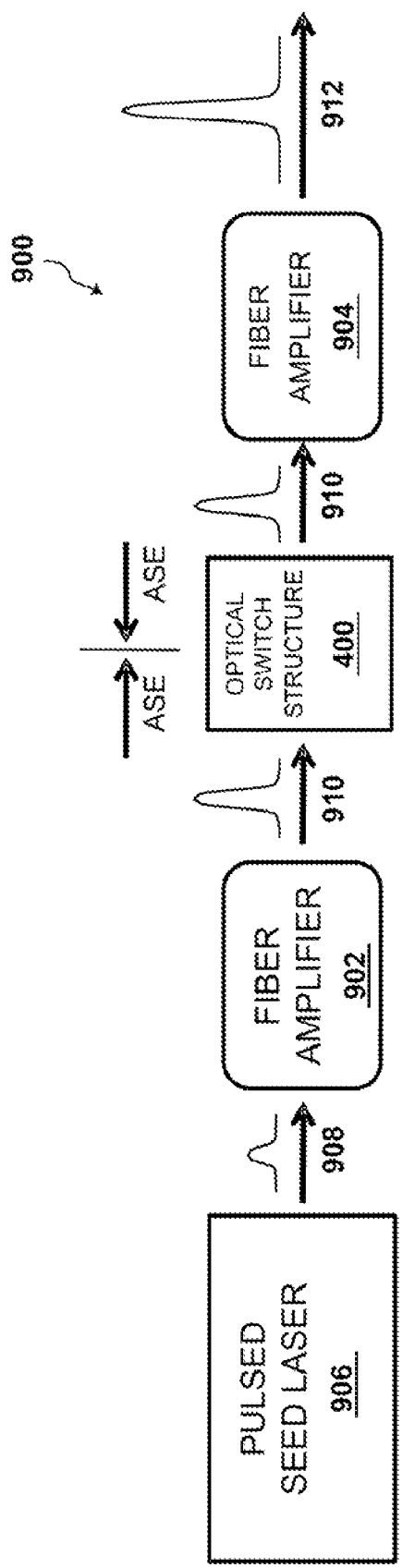
FIG. 9 is a diagrammatic view of an embodiment of a two-stage fiber amplifier system including the optical switch structure of FIG. 4 disposed between first and second fiber amplifiers.

FIG. 9 is a diagrammatic view of an embodiment of a two-stage fiber amplifier system 900 including the optical switch structure 400 of FIG. 4 disposed between first and second fiber amplifiers 902 and 904. The system 900 may be used for two-stage amplification of a pulsed seed laser 906. In such an embodiment, the seed laser 906 is configured to output a low-peak-power pulse 908 that is received and amplified by the first fiber amplifier 902 to generate an amplified pulse 910. The amplified pulse 910 may be transmitted through the optical switch structure 400 (see FIG. 4) with substantially zero attenuation. The amplified pulse 910 transmitted through the optical switch structure 400 may be further amplified in a second fiber amplifier 904 to generate a highly-amplified output pulse 912.

In such an embodiment, the optical switch structure 400 may substantially prevent ASE generated in the first fiber amplifier 902 from being transmitted to the second fiber amplifier 904, and the optical switch structure 400 may substantially prevent ASE generated in the second fiber amplifier 904 from being transmitted to the first fiber amplifier 902. This bidirectional blocking of ASE may enable both fiber amplifiers 902 and 904 to be operated at very high small-signal gain. The optical switch structure 400 may reduce or substantially eliminate multi-stage amplification of ASE and/or multi-stage parasitic lasing (e.g. due to reflections at optical interfaces or in-fiber Rayleigh scattering). The optical switch structure 400 may further prevent damage to the second fiber amplifier 904 or other optical components by regulating the amplitude of the amplified pulse 910 transmitted through the optical switch structure 400. In further embodiments, a plurality of optical switch structures may be used in conjunction with a plurality of fiber amplifiers to create a wide variety of multi-stage fiber amplifier systems.

Figure 10:
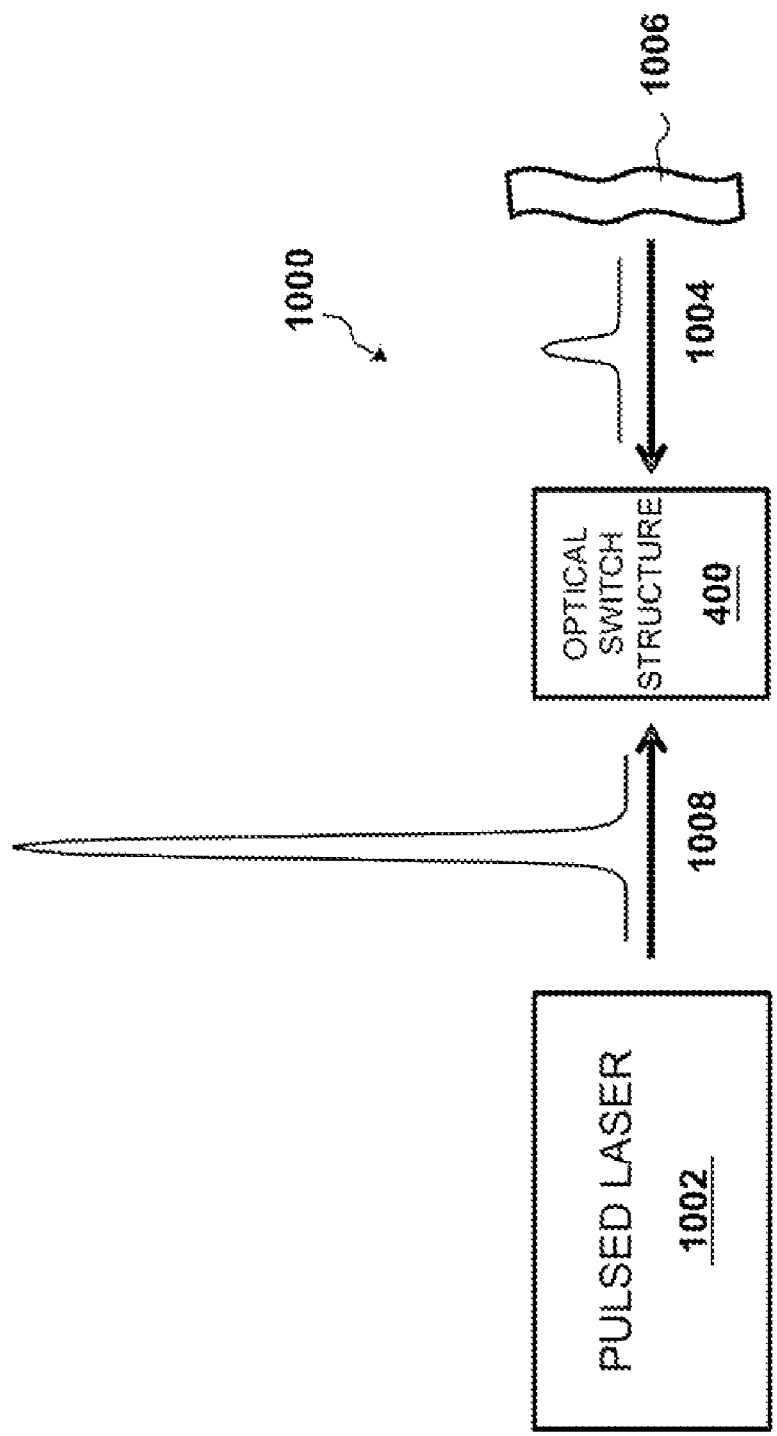
FIG. 10 is a diagrammatic view of an optical system illustrating the use of the optical switch structure of FIG. 4 to isolate a pulsed laser source from back-reflected pulses according to an embodiment.

FIG. 10 is a diagrammatic view of an embodiment of an optical system 1000 illustrating the use of the optical switch structure 400 shown in FIG. 4 to substantially optically isolate a pulsed laser source 1002 from a back-reflected pulse 1004 reflected from a reflective surface 1006. In system 1000, the optical switch structure 400 is positioned between the pulsed laser source 1002 and the reflective surface 1006. The optical switch structure 400 substantially blocks the low-power back-reflected pulse 1004, while also allowing a high-power pulse 1008 output by the pulsed laser 1002 to pass therethrough. Such optical isolation is often desirable in pulsed laser systems because even a small amount of back-reflected signal may be amplified to very high-peak power if it is coupled back into the pulsed laser 1002, where it may cause damage to one or more optical components. A related problem concerns pulsed laser systems whose operation may be disrupted by parasitic cw lasing due to back-reflected light from one or more surfaces. In the illustrated embodiment shown in FIG. 10, the optical switch structure 400 provides double-pass attenuation of any such circulating cw signal.

Figure 11:
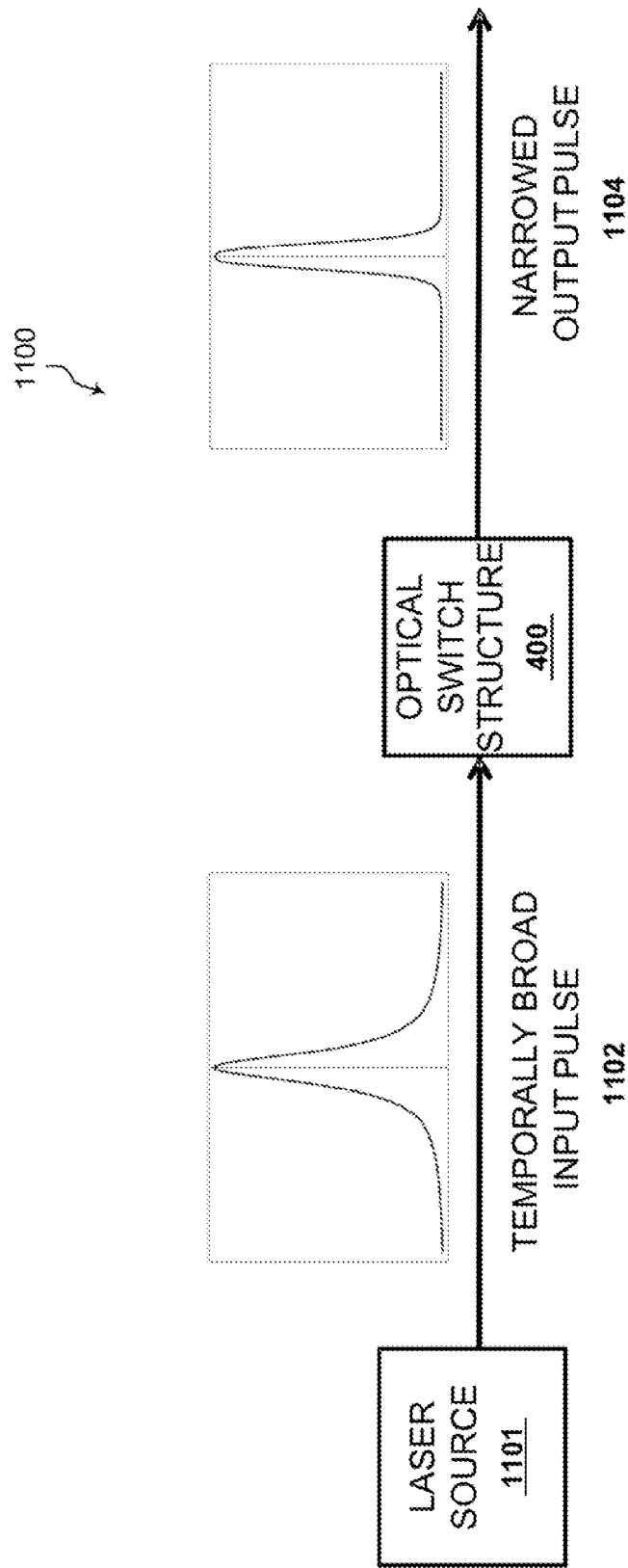
FIG. 11 is a diagrammatic view of an optical system illustrating the use of the optical switch structure of FIG. 4 to alter the temporal shape of a laser pulse according to an embodiment.

FIG. 11 is a diagrammatic view of an embodiment of an optical system 1100 illustrating the use of the optical switch structure 400 of FIG. 4 to alter the temporal shape of a laser pulse. In such an application one or more of disclosed optical switch structures and/or optical limiter structures may be used for a wide variety of pulse shaping applications including, but not limited to, the elimination of broad "wings" in the time domain intensity waveform of a pulse light source, as illustrated in FIG. 11, the elimination of one or more "pedestals" of lower peak power and longer duration than the desired portion of the pulsed waveform, pulse steepening, pulse shortening, pulse splitting, and decoupling pulse pulsed waveforms from cw background signals. As shown in FIG. 11, the system 1100 includes a laser source 1101 configured to output a temporally broad input pulse 1102. The optical switch structure 400 is positioned to receive the input pulse 1102, which may be transmitted into and through the optical switch structure 400. The optical switch structure 400 narrows the temporally broad input pulse 1102 (i.e., a first temporal pulse shape) by filtering lower power portions thereof so that a narrowed output pulse 1104 (i.e., a second temporal pulse shape different than the first temporal pulse shape) is output from the optical switch structure 400.

Figure 12:
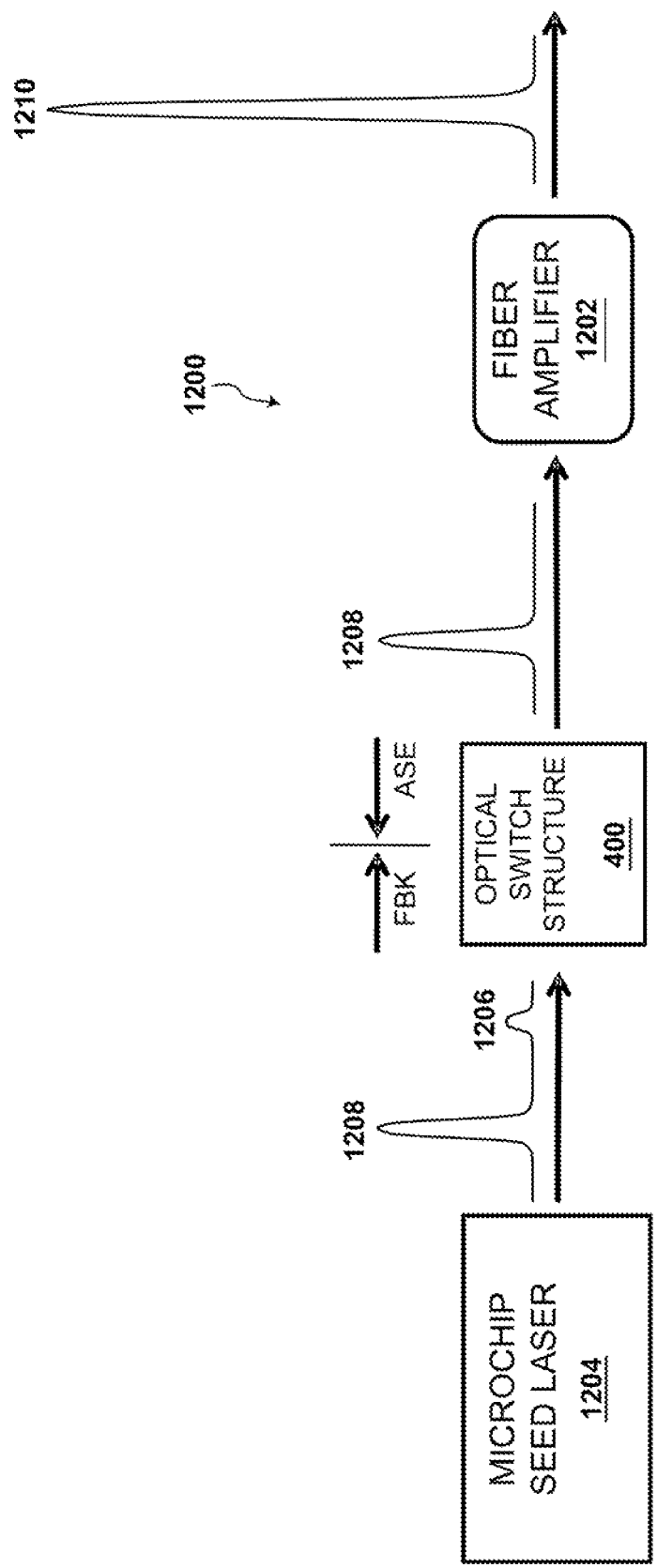
FIG. 12 is a diagrammatic view of an embodiment an of optical system illustrating the use of the optical switch structure of FIG. 4 to provide bidirectional optical isolation between a fiber amplifier and a passively-q-switched, micro-chip laser seed source, and elimination of the after-pulse generated by the micro-chip laser.

FIG. 12 is a diagrammatic view of an embodiment of an optical system 1200 illustrating the use of the optical switch structure 400 shown FIG. 4 to provide bidirectional optical isolation between a fiber amplifier 1202 and a passively-q-switched, micro-chip laser seed source 1204, and elimination of one or more after-pulses 1206 generated by the micro-chip laser 1204. In the absence of the optical switch structure 400, both a main pulse 1208 and the after-pulse 1206 would be present in the amplified output 1210 output by the fiber amplifier 1202, which is undesirable in many applications. The after-pulse generated by many micro-chip lasers may result from spatial hole burning in the gain medium of the micro-chip laser and may be difficult to eliminate by other means. In the absence of the optical switch structure 400, backward propagating ASE generated by the fiber amplifier 1202 may be reflected off of the output coupler (not shown) of the micro-chip chip laser 1204, resulting in further amplification of ASE, parasitic lasing, and/or damage to the micro-chip laser 1204.

In operation, the microchip seed laser 1204 outputs a pulse including the main pulse 1208 and the after-pulse 1206, which is received by the optical switch structure 400. The optical switch structure 400 substantially blocks the low-power after-pulse 1206 from being received by the fiber amplifier 1202, while allowing the high-power main pulse 1208 to be transmitted therethrough to the fiber amplifier 1202. The fiber amplifier 1202 amplifies the main pulse 1208 to generate the amplified output 1210. The optical switch structure 400 also substantially blocks amplified spontaneous emission output from the fiber amplifier 1202 from being received by the microchip seed laser 1204.

Figure 13:
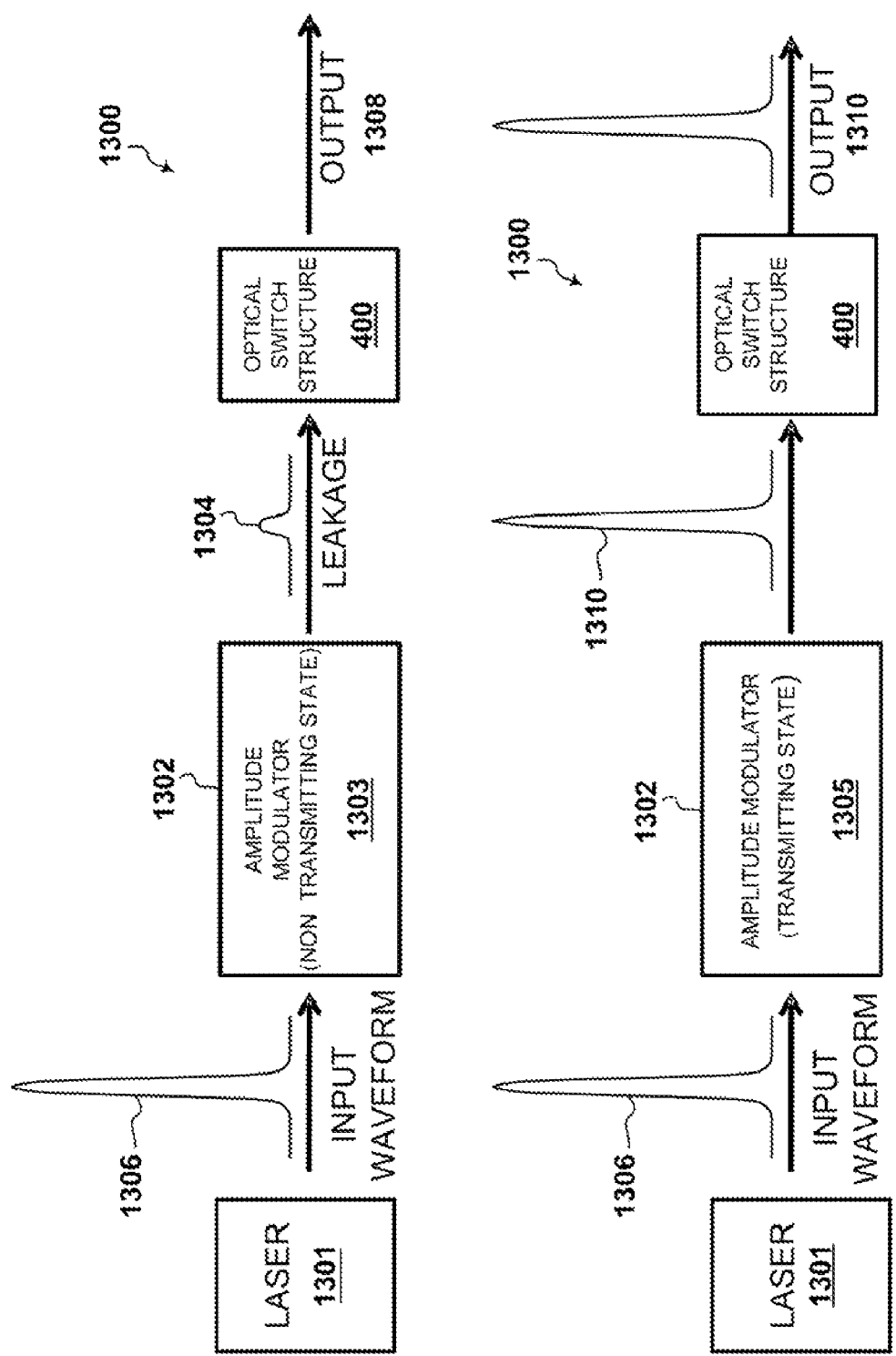
FIG. 13 is a diagrammatic view of an embodiment of an optical system illustrating the use of the optical switch structure of FIG. 4 to enhance the extinction ratio of an amplitude modulator.

FIG. 13 is a diagrammatic view of an embodiment of an optical system 1300 illustrating the use of the optical switch structure 400 shown in FIG. 4 to enhance the extinction ratio of an amplitude modulator. The system includes an amplitude modulator 1303 (e.g., a Pockels cell or an acoustic-optical modulator) disposed between a laser source 1301 and the optical switch structure 400. The amplitude modulator 1303 is configurable between a non-transmitting state in which a low-amplitude leakage pulse 1304 is output therefrom while an input pulse or waveform 1306 output from the laser 1301 is substantially blocked, and a transmitting state in which the input pulse 1306 is transmitted.

In operation, the low-amplitude leakage pulse 1304 is substantially blocked by the optical switch structure 400 to thereby enhance the extinction ratio between input pulse 1306 and output pulse 1308 when the amplitude modulator 1302 is in its nominally non-transmitting state (1303). On the other hand, when the amplitude modulator is in its transmitting state (1305), the optical switch structure 400 may have substantially no effect on the amplitude of the transmitted pulse 1310 (i.e., the input pulse 1306). Thus, the optical switch structure 400 may allow the extinction ratio of the amplitude modulator 1302 to be increased drastically without any significant insertion loss penalty.

In other embodiments pertaining to enhancement of amplitude modulator performance, one or more stages of amplification may be used with a low-peak-power seed source to ensure that pulses amplified while the amplitude modulator is in its transmitting state attain a peak power of order $P_{T=100\%}$, such that they may be transmitted through the optical switch structure without substantial attenuation. In further embodiments pertaining to enhancement of amplitude modulator performance, the use of one or more optical switch structures in conjunction with an amplitude modulator provides a faster rise time and/or fall time in the switching waveform of the transmitted optical signal.

Figure 14:
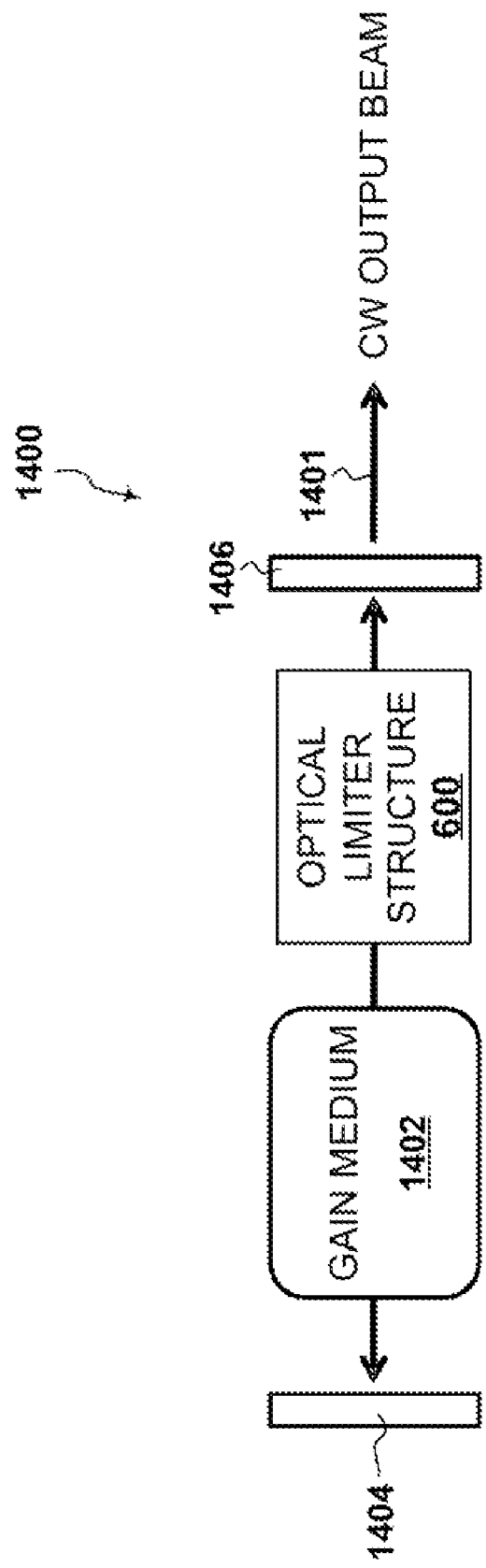
FIG. 14 is a diagrammatic view of an embodiment of an optical system illustrating the use of the optical limiting structure of FIG. 6 to suppress amplitude fluctuations in a cw laser.

FIG. 14 is a diagrammatic view of an embodiment of an optical system 1400 illustrating the use of the optical limiter structure 600 of FIG. 6 to suppress amplitude fluctuations in a cw laser. The system 1400 includes a laser comprising a gain medium 1402 disposed between a mirror 1404 and a partially reflective mirror 1406 that define an optical cavity. The optical limiter structure 600 is disposed between the gain medium 1402 and the mirror 1406.

In operation, the optical limiter structure 600 may transmit low power (e.g. cw) signals 1401 with negligible attenuation while absorbing high-peak power pulses that may arise from relaxation oscillations, self-q-switching, chaotic pulsing, or other sources of amplitude instability (e.g. instabilities induced by fluctuations in absorbed pump power). Accordingly, the low power signals 1401 are transmitted through the mirror 1406. The insertion of a large intra-cavity loss for such amplitude spikes may substantially prevent their regenerative amplification. While the embodiment in FIG. 14 depicts the gain medium 1402 and the optical limiter structure 400 sandwiched between the mirrors 1404 and 1406 to form a linear standing-wave cavity, it should be understood that this embodiment may be practiced in wide variety of laser configurations (e.g., ring, compound cavity, folded resonator, etc.).

Figure 15:
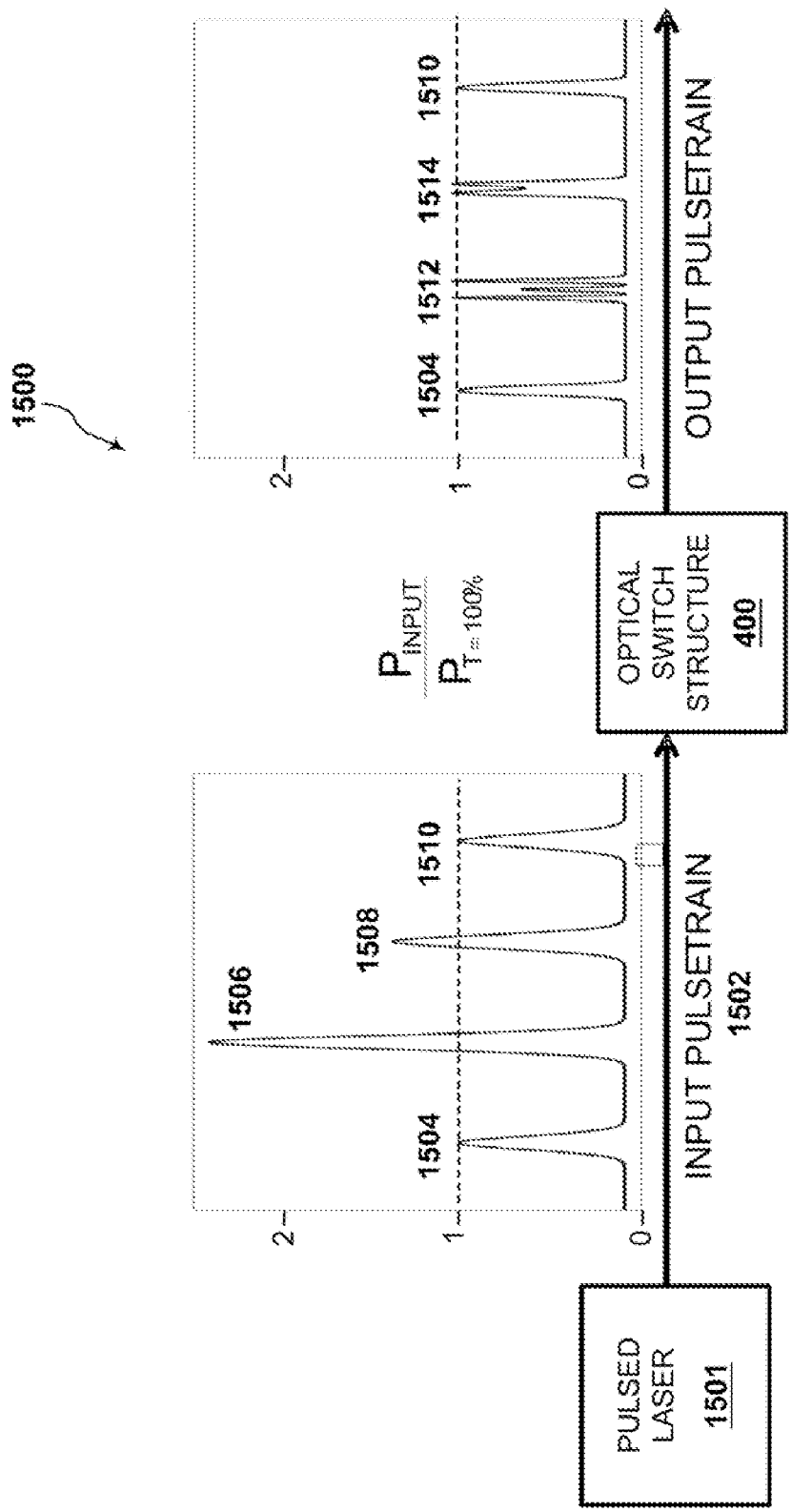
FIG. 15 is a diagrammatic view of an embodiment of an optical system illustrating the use of the optical switch structure of FIG. 4 to prevent a pulsed waveform from exceeding the optical damage threshold of one or more downstream optical components.

FIG. 15 is a diagrammatic view of an embodiment of an optical system 1500 illustrating the use of the optical switch structure 400 of FIG. 4 to prevent a pulsed waveform from exceeding the optical damage threshold of one or more downstream optical components. The system 1500 includes a pulsed laser 1501 operably coupled to the optical switch structure 400. The pulsed laser 1501 may generate an input pulse train 1502 having two pulses each having a peak power at or below a threshold power comparable to $P_{T=100\%}$ (1504 and 1510) and two "rogue pulses" 1506 and 1508 each having a peak power above the threshold power (i.e., of significantly higher amplitude).

In operation, the pulse train 1502 output from the pulsed laser 1501 is received by the optical switch structure 400. The amplitude irregularities in the input pulse train 1502 can result, for example, from mode beating within the pulsed laser 1501 operating on multiple longitudinal modes. In some applications, even one such high-amplitude rogue pulse can permanently damage downstream optical components. The optical switch structure 400 substantially prevents transmission of the rogue pulses 1506 and 1508 at a power greater than $P_{T=100\%}$.

For example, it is sometimes desirable to amplify such pulses in a large mode area fiber amplifier to several megawatts ("MW") peak power. It is important, however, not to exceed the threshold power for self-focusing in the fiber (~4 MW), because catastrophic beam collapse and optical damage may occur instantaneously. Thus, if such a seed source is used to generate 3 MW output pulses from seed pulses such as 1504 and 1510 having a peak power of order $P_{T=100\%}$, the rogue pulse 1506 may, in the absence of the optical switch structure 400, destroy a downstream fiber amplifier that attempts to amplify pulse 1506 well beyond 4 MW.

In addition to self-focusing, optical damage (dielectric breakdown) inside the fiber has a sharply defined threshold as well. Depending on the mode field area of the fiber, the threshold for optical damage may be substantially less than ~4 MW, the threshold for self-focusing. For example, one may operate a large-mode-area fiber amplifier having an optical damage threshold of 400 kW at a peak power of 300 kW on an indefinite basis. But a single instance of longitudinal mode beating in a seed source such as a pulsed laser diode or q-switched laser may be sufficient to destroy such an amplifier. The ability of the optical switch structure 400 to automatically reduce the peak power of rogue pulses 1506 and 1508 to approximately $P_{T=100\%}$ (pulses 1512 and 1514) is a direct consequence of the $T = \sin^4[(\pi\ P_{input})/(2\ P_{T=100\%})]$ transfer function.

In other embodiments the optical limiter structure 600 of FIG. 6 having the nominal transfer function $T = 1 - \sin^4[(\pi\ P_{input})/(2\ P_{T=100\%})]$, and more generally, devices having other transfer functions such as $T = \sin^4[(\pi\ [P_{input} - P_{T=0\%}])/(2\ P_{T=100\%})]$ may be configured so as provide protection from optical damage in an analogous manner. In other embodiments, one or more optical switches and/or optical limiter structures may provide bidirectional ASE isolation and optical damage protection simultaneously. For example, in the two-stage pulse amplification system 900 shown in FIG. 9, the optical switch structure 400 may provide the second fiber amplifier 904 with some degree of protection from amplitude fluctuations in the pulsed seed laser 906.

Figure 16:
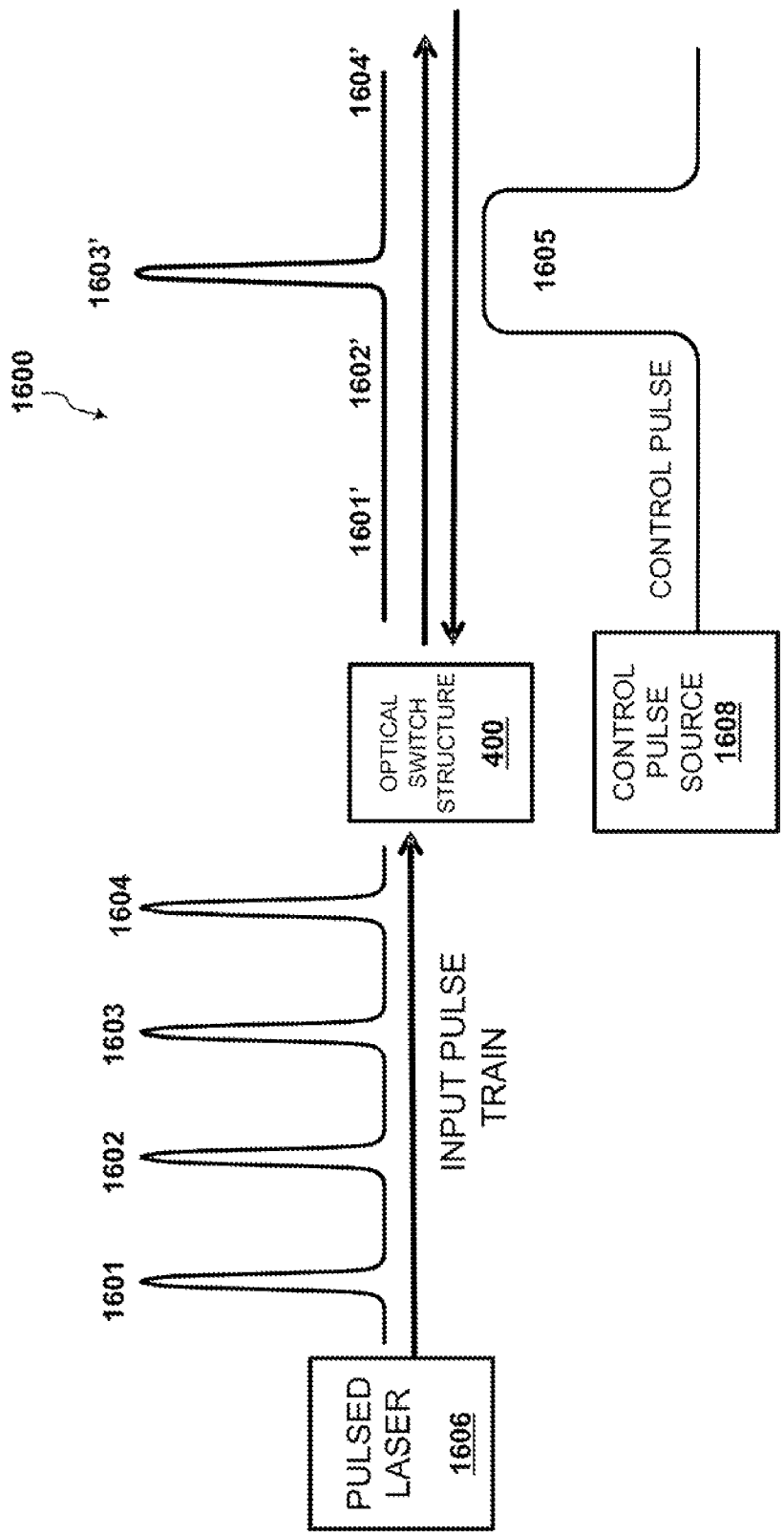
FIG. 16 is a diagrammatic view of an embodiment of an optical system illustrating the use of the optical switch structure of FIG. 4 for all-optical switching of a pulsed waveform.

FIG. 16 is a diagrammatic view of an embodiment of an optical system 1600 illustrating the use of the optical switch structure 400 of FIG. 4 for all-optical switching of a pulsed waveform. The system 1600 includes a pulsed laser 1606 configured to output a high-repetition-rate pulse train that includes input pulses 1601-1604 (e.g. generated by a mode-locked laser), a control pulse source 1608 configured to output one or more control pulses 1605, and the optical switch structure 400 operably coupled to the pulsed laser 1606 and the control pulse source 1608.

In operation, the input pulse train of input pulses 1601-1604 is transmitted into the optical switch structure 400 along with the counter-propagating control pulse 1605. At the location of the optical switch structure 400, the timing of the control pulse 1605 is substantially coincident (overlapping in time) with, for example, the input pulse 1603. The combined peak-power of the input pulse 1603 and the control pulse 1605 is of order $P_{T=100\%}$. For example, the peak power of the input pulse 1603 may be $0.1\,P_{T=100\%}$, and the peak power of the control pulse 1605 may be $0.9\,P_{T=100\%}$. In the absence of the control pulse 1605, the transmittance of the optical switch structure 400 is very low (in this example, 0.06%) because $P_{input} \ll P_{T=100\%}$. Thus, the transmittance of the optical switch structure 400 for input pulses 1601, 1602, and 1604 is substantially zero. On the other hand, because the combined peak power of the input pulse 1603 and the control pulse 1605 is of order $P_{T=100\%}$, the transmittance of the optical switch structure 400 for input pulse 1603 is substantially 100%.

Such an embodiment may be used for applications such as "pulse picking", as explained next. For example, in one representative application, a mode-locked fiber laser provides a convenient means of generating 5-picosecond-duration pulses having a specific desired time-domain waveform and wavelength spectrum. A repetition rate of 100 kHz is desired for a particular application, but the mode-locked fiber laser operates at a repetition rate of 10 MHz. Referring to the representative embodiment shown in FIG. 16, if the backward-propagating control pulse 1605 comprises a properly timed 100 kHz pulse train, only every $100^{th}$ input pulse will be transmitted in the forward-propagating direction through the optical switch structure, thereby providing a source of 5-ps-pulses at a repetition rate of 100 kHz.

Alternatively, the control pulse 1605 may comprise a mode-locked pulse train and the "input" signal could comprise a low-repetition-rate, low-duty-cycle waveform, a brief portion of which (~5 ps, in this example) would be transmitted in the forward direction. The choice of waveforms for the input and control signals may be application dependent, and may be driven by a variety of considerations such as the power and/or wavelength of available laser sources, and the amount of switching extinction ratio required.

The above embodiment is meant to by illustrative and not limiting in any way. Numerous other all-optical switching embodiments are possible, involving the interaction of two or more co-propagating and/or counter-propagating pulses, at substantially the same or substantially different wavelengths, wherein such pulsed waveforms may be derived from the same laser source, two or more different laser sources operating independently, or two or more laser sources having specific phase and/or frequency relationships. For instance, in the example discussed above, a 9.9 MHz mode-locked laser pulse train could replace the 100 kHz control pulse waveform 165. Provided the correct phase relationship is maintained between the 9.9 MHz control and 10 MHz input waveforms, a 100 kHz pulse train would be transmitted in the forward propagating direction through the optical switch structure 164.

In one of the examples discussed above, the peak power of the input pulses 1601-1604 was $0.1\,P_{T=100\%}$, the peak power of the control pulse 1605 was $0.9\,P_{T=100\%}$, the on-state transmittance of the optical switch structure 400 for the input pulse train was 100%, and the off-state transmittance of the optical switch structure 400 for the input pulse train was 0.06%. A potential disadvantage of such a configuration is that the peak power of the control pulse 1605 must be approximately an order of magnitude greater than the input signal being controlled. If the peak powers of the input and control signals been made comparable ($P_{input}=0.5\,P_{T=100\%}$, $P_{control}=0.5\,P_{T=100\%}$), optical switching would still be observed, but the off-state transmittance would be of order 25%, rather than 0.06%. Other embodiments may be directed towards reducing the required peak-power of the control signal while maintaining high on/off switching extinction ratio.

Such embodiments include those that take advantage of the fact that the transmittance as a function of the input power, $T(P_{input})$, for both the optical switch structure (FIG. 4) and optical limiter structure (FIG. 6), is a periodic function of $P_{input}$. For example, in the case of the optical switch structure, earlier we noted that as the input power is increased beyond $P_{T=100\%}$ the transmittance T decreases until it reaches a minimum of substantially zero at an input power of $P=2\,P_{T=100\%}$. More generally, the transmittance T is substantially 100% when $P=(2m+1)\,P_{T=100\%}$, and the transmittance T is substantially 0% when $P=2m\,P_{T=100\%}$, where $m=0, 1, 2, 3$, etc. Thus, for example, it is possible to have an input signal comprising a cw input beam of power $P_{input}=2m\,P_{T=100\%}$, which, in the absence of a control signal, is not transmitted in the forward direction. Then, for example, the application of a backward propagating control pulse of peak power $P_{control}=P_{T=100\%}$ may result in substantially 100% of the cw input signal being transmitted in the forward direction for substantially the duration of the control pulse. In this manner, the ratio $P_{control}/P_{input}$ is reduced to of order $1/m$, and very high on/off extinction ratio is simultaneously obtained. Other such embodiments that exploit the periodicity of the $T(P_{input})$ transfer function may be contemplated, including switching architectures based on the optical limiter structure of FIG. 6, rather the optical switch structure of FIG. 4.

Figure 17A:
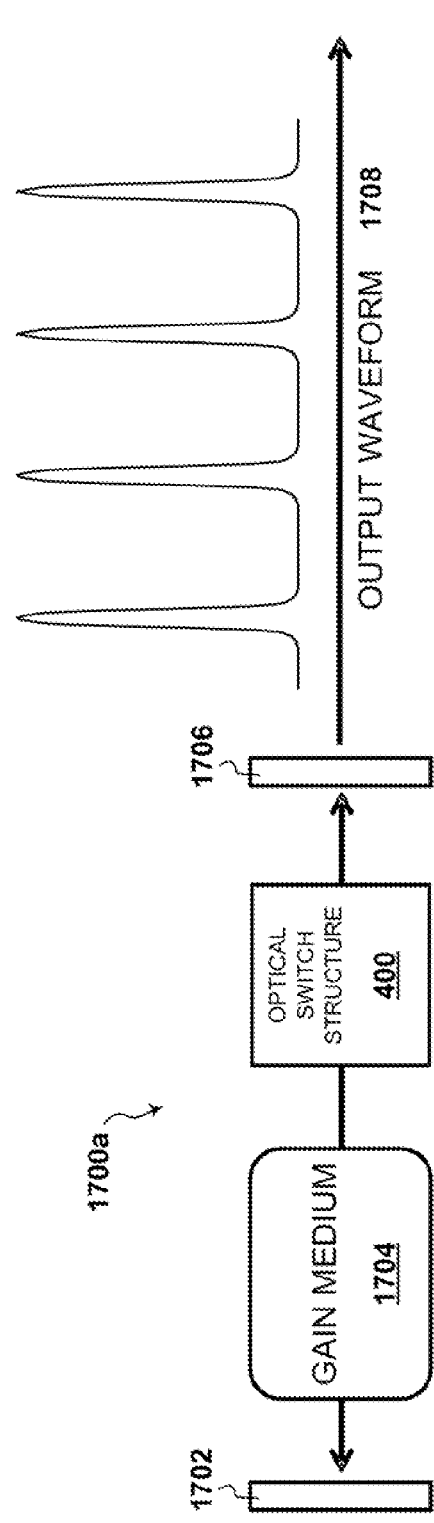
FIGS. 17a and 17b are diagrammatic views of embodiments of an optical system illustrating the use of the optical switch structure of FIG. 4 as a nonlinear element of a passively mode-locked laser.
Figure 17B:
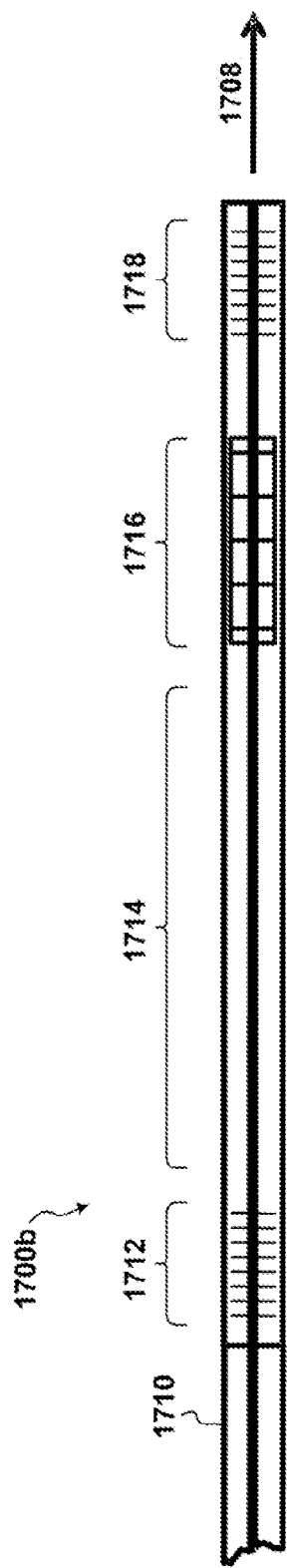

FIG. 17a is a diagrammatic view of an embodiment of a mode-locked laser system 1700a illustrating the use of the optical switch structure 400 of FIG. 4 as a nonlinear element. The mode-locked laser system 1700a includes an end mirror 1702, a gain medium 1704, the optical switch structure 400, and an output coupler 1706 in a linear, standing-wave cavity. It should be understood that a wide variety of mode-locked laser configurations are possible, including, but not limited to, standing-wave cavities, ring cavities, compound cavities, or combinations of the foregoing, which may incorporate a wide variety of other components (e.g. filters, optical isolators, active modulators). FIG. 17b depicts an embodiment of an all-fiber mode-locked laser architecture 1700b based on the optical switch structure 400 of FIG. 4. This all-fiber mode-locked laser comprises a fiber coupled pump 1710, a fiber Bragg grating end mirror 1712, a section of gain fiber 1714, an all-fiber version of the optical switch structure 1716, and a fiber Bragg grating output coupler 1718. In certain embodiments, some or all fibers comprising such a structure are fusion spliced together. The gain fiber 1714 may be core pumped, in which case the fiber coupled pump source 1710 may comprise a single-mode fiber having a near diffraction-limited output. Alternatively, the gain fiber 1714 may be cladding pumped, in which case the gain fiber 1714 and fiber Bragg Grating end mirror 1712 may comprise double-clad or multi-clad fiber structures, and the fiber coupled pump source may 1710 comprise a multimode fiber. FIGS. 17a and 17b are representative embodiments of how the power-dependent optical filter devices disclosed herein may be used to simplify, or drastically simplify, the architecture of mode-locked laser systems.

Figure 18:
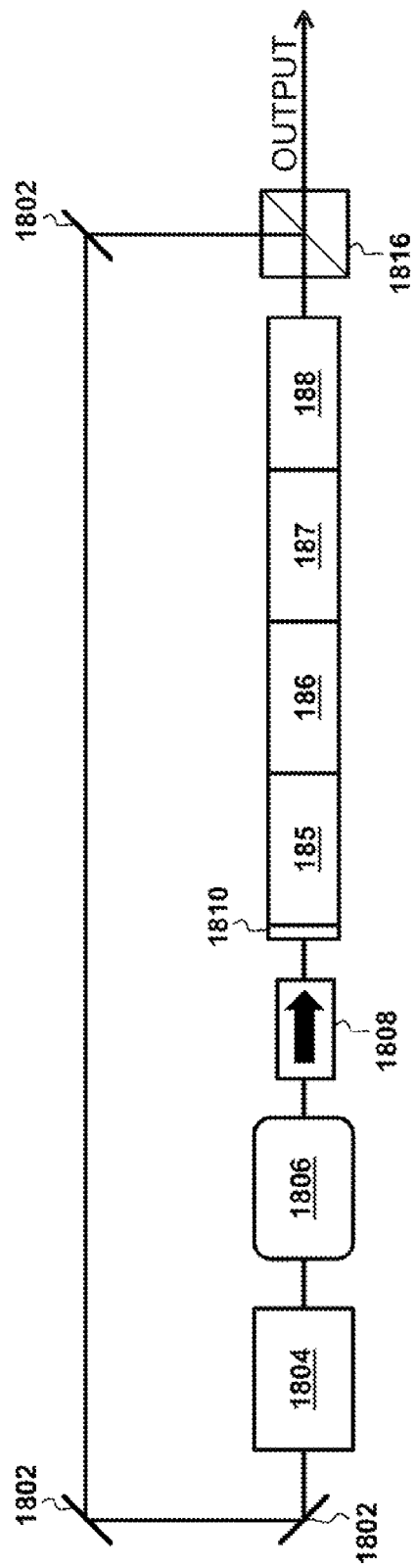
FIG. 18 is a diagrammatic view of an embodiment of an optical system illustrating the use of the optical switch structure of FIG. 4 as a power-dependent output coupler in a q-switched laser.

FIG. 18 is a diagrammatic view of an embodiment of an optical system 1800 illustrating the use of the optical switch structure 400 of FIG. 4 as a power-dependent output coupler in a q-switched laser. In this representative embodiment, an actively q-switched ring laser comprises a plurality of cavity mirrors 1802, an amplitude modulator 1804, a gain section 1806, an optical isolator 1808 (to ensure substantially unidirectional propagation inside the ring cavity), a polarizer 1810, the four-fiber structure of FIG. 3 (represented as fibers 1811-1814), and a polarizing beam splitter 1816. The cavity mirrors 1802 and the polarizing beam splitter 1816 define an optical cavity of the ring laser.

Such a cavity may provide for low-loss recirculation of low power pulses for regenerative amplification, and selective output coupling of high-peak power pulses to thereby substantially terminating the regenerative amplification process for a circulating pulse that reaches a predetermined peak power. Such a power-dependent output coupler may be used to provide substantially higher efficiency than a conventional q-switched laser (in which a fixed fraction of the signal undergoing regenerative amplification leaks out of the cavity during each round trip). Such a configuration may also substantially eliminate q-switch laser "pre-pulses" (low-amplitude pulses that precede the main output pulse, resulting from output coupler leakage during regenerative amplification). In some applications, such pre-pulses may be detrimental.

It should be understood that the embodiment shown in FIG. 18 is merely representative and is not meant to be limiting in any way. Rather, it is one of many regenerative amplification configurations contemplated in which one or more of the embodiments of the power selective optical switch structures disclosed herein is used to recirculate a pulse undergoing regenerative amplification until the circulating pulse reaches a peak power of order $P_{T=100\%}$, at which point the pulse is automatically coupled out of the regenerative amplifier by a power selective optical filter such as those disclosed herein.

Figure 19:
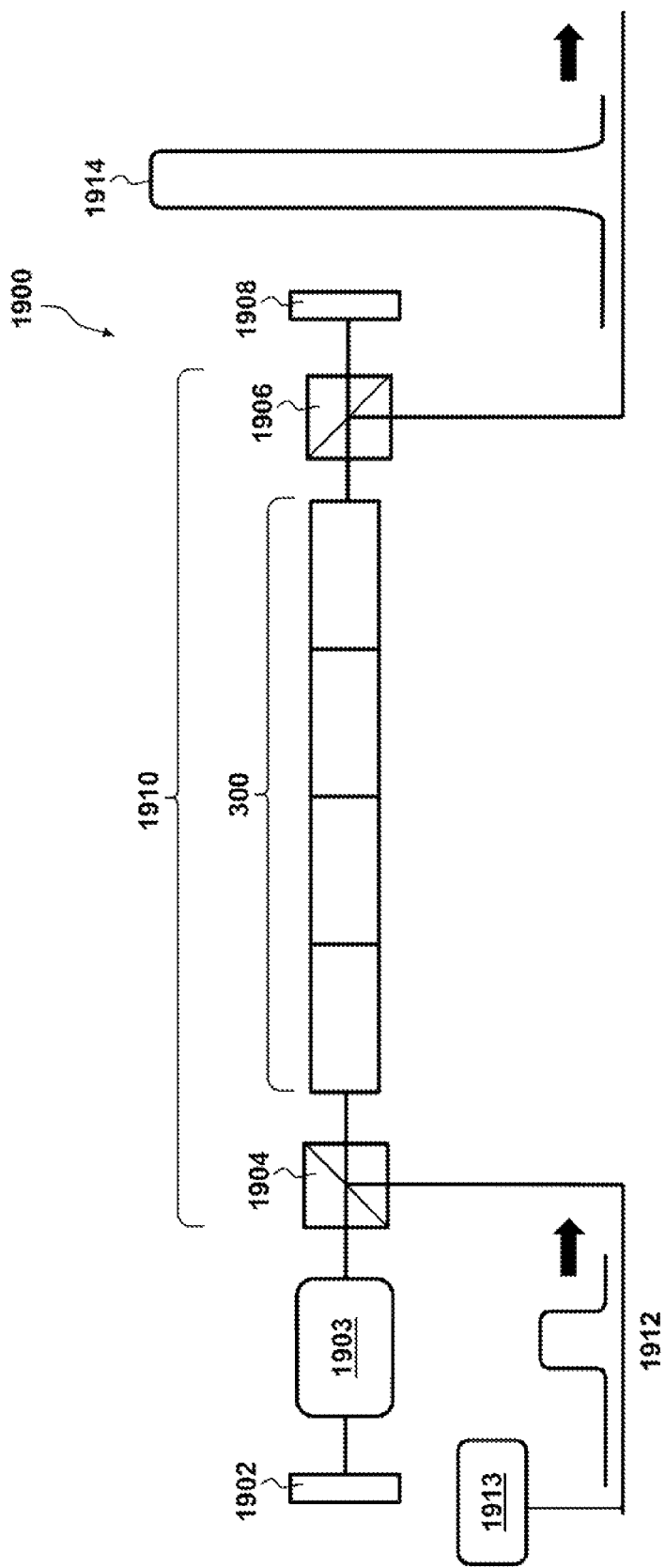
FIG. 19 is a diagrammatic view of an embodiment of an optical system illustrating the use of the optical switch structure of FIG. 4 for lasing cavity dumping.

FIG. 19 is a diagrammatic view of an embodiment of an optical system 1900 illustrating the use of the optical limiter structure 600 of FIG. 6 for lasing cavity dumping. The system 1900 comprises a first cavity end mirror 1902, a gain medium 1903, a first polarizing beam splitter 1904, the four-wave-plate structure 300 of FIG. 3, a second polarizing beam splitter 1906, and a second cavity end mirror 1908. Components 1904, 300, and 1906 together define a power-dependent optical filter 1910. In an embodiment, the circulating intra-cavity power is adjusted such that the interaction of SPM and XPM in the four-wave-plate structure 300 rotates the polarization of cw intracavity light passing therethrough by m×180°, where m is an integer greater than or equal to 1, thereby generating no net change in polarization state. One or more control pulses 1912 output from a control pulse source 1913 are directed through the four-wave-plate structure 300 and results in an additional 90° of polarization rotation in the four-wave-plate structure 300 that switches light out of the laser cavity for substantially the duration of the control pulse 1912. Thus, the application of the control pulse 1913 increases the power of the circulating signal in the optical cavity defined by the first cavity end mirror 1902 and the second cavity end mirror 1908 so that the polarization is rotated an additional 90°, which is selectively directed out of the optical cavity by the second polarizing beam splitter 1906. Where m>>1, the peak power of the cavity dumped output signal 1914 may be substantially larger than the peak power of the control pulse 1912.

In related embodiments, the optical switch structure 400, optical limiter structure 600, and/or related embodiments disclosed herein may be used to multiplex and/or demultiplex cw and high-peak-power signals, and more generally, low-peak-power signals and high-peak-power signals. Thus embodiments described herein may be used to "decouple" a high-peak-power signal from a large cw background, for example.

The embodiments of the present invention may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

The invention claimed is:

1. A wave-plate structure, comprising:
a first substantially zero-order, zero-wave plate; and
a second substantially zero-order, zero-wave plate arranged in series with the first substantially zero-order, zero-wave plate and oriented at a selected angle relative to the first substantially zero-order, zero-wave plate, the first and second substantially zero-order, zero-wave plates configured to alter a polarization state of an input signal passing therethrough in a manner that is dependent on the power of the input signal, each of the first and second substantially zero-order, zero-wave plates including,
an entry wave plate having a slow axis and a fast axis; and
an exit wave plate having a slow axis and a fast axis;
wherein the fast axis of the entry wave plate is oriented substantially perpendicular to the fast axis of the exit wave plate; and
wherein the slow axis of the exit wave plate of the first substantially zero-order, zero-wave plate is oriented at about 40 degrees to about 50 degrees relative to the slow axis of the entry wave plate of the second substantially zero-order, zero-wave plate.

2. The wave-plate structure of claim 1 wherein the slow axis of exit wave plate of the first substantially zero-order, zero-wave plate is oriented at about 43 degrees to about 47 degrees relative to the slow axis of the entry wave plate of the second substantially zero-order, zero-wave plate.

3. The wave-plate structure of claim 2 wherein the slow axis of exit wave plate of the first substantially zero-order, zero-wave plate is oriented at about 45 degrees relative to the slow axis of the entry wave plate of the second substantially zero-order, zero-wave plate.

4. The wave-plate structure of claim 3 wherein the first, second, third, and fourth polarization-maintaining fibers are fusion spliced together to form an integral fiber structure.

5. The wave-plate structure of claim 1 wherein the first and second substantially zero-order, zero-wave plates each comprises bulk birefringent optical elements.

6. The wave-plate structure of claim 1 wherein:
the entry wave plate of the first substantially zero-order, zero-wave plate comprises a first polarization-maintaining fiber;
the exit wave plate of the first substantially zero-order, zero-wave plate comprises a second polarization-maintaining fiber spliced with the first polarization-maintaining fiber, the first and second polarization-maintaining fibers each exhibiting substantially the same net birefringence;
the entry wave plate of the second substantially zero-order, zero-wave plate comprises a third polarization-maintaining fiber;
the exit wave plate of the second substantially zero-order, zero-wave plate comprises a fourth second polarization-maintaining fiber spliced with the third polarization-maintaining fiber, the third and fourth polarization-maintaining fibers each exhibiting substantially the same net birefringence;
wherein the second polarization-maintaining fiber is spliced to the third polarization-maintaining fiber at a predetermined splice angle; and wherein each of the first, second, third, and fourth polarization-maintaining fibers exhibit approximately the same net nonlinearity.

7. A power selective optical filter device, comprising:
an input polarizer having a transmission axis, the input polarizer configured to selectively transmit at least a portion of an input signal therethrough, wherein the at least a portion of the input signal exhibits a polarization state and a power;
a wave-plate structure positioned to receive the at least a portion of the input signal, the wave-plate structure including,
a first substantially zero-order, zero-wave plate; and
a second substantially zero-order, zero-wave plate arranged in series with the first substantially zero-order, zero-wave plate and oriented at a selected angle relative to the first substantially zero-order, zero-wave plate, the first and second substantially zero-order, zero-wave plates configured to alter the polarization state of the at least a portion of the input signal passing therethrough in a manner that is dependent on the power of the at least a portion of the input signal, each of the first and second substantially zero-order, zero-wave plates including,
an entry wave plate having a fast axis; and
an exit wave plate having a fast axis, the fast axis of the entry wave plate oriented substantially perpendicular to the fast axis of the exit wave plate, each of the entry wave plates of the first and second substantially zero-order, zero-wave plates oriented relative to the transmission axis of the input polarizer at a respective selected entry-wave-plate angle; and
an output polarizer positioned to receive the polarization-state-altered signal output from the wave-plate structure, the output polarizer configured to selectively transmit at least a portion of the polarization-state-altered signal based on the polarization state thereof.

8. The power selective optical filter device of claim 7 wherein the output polarizer has a transmission axis that is substantially perpendicular to the transmission axis of the input polarizer.

9. The power selective optical filter device of claim 7 wherein the output polarizer has a transmission axis that is substantially parallel to the transmission axis of the input polarizer.

10. The power selective optical filter device of claim 7 wherein the first and second substantially zero-order, zero-wave plates each comprises bulk birefringent optical elements.

11. The power selective optical filter device of claim 7 wherein:
the entry wave plate of the first substantially zero-order, zero-wave plate comprises a first polarization-maintaining fiber;
the exit wave plate of the first substantially zero-order, zero-wave plate comprises a second polarization-maintaining fiber spliced with the first polarization-maintaining fiber, the first and second polarization-maintaining fibers each exhibiting substantially the same net birefringence;
the entry wave plate of the second substantially zero-order, zero-wave plate comprises a third polarization-maintaining fiber;
the exit wave plate of the second substantially zero-order, zero-wave plate comprises a fourth second polarization-maintaining fiber spliced with the third polarization-maintaining fiber, the third and fourth polarization-maintaining fibers each exhibiting substantially the same net birefringence;
wherein the second polarization-maintaining fiber is spliced to the third polarization-maintaining fiber at a predetermined splice angle; and
wherein each of the first, second, third, and fourth polarization-maintaining fibers exhibit approximately the same net nonlinearity.

12. The power selective optical filter device of claim 11 wherein:
the input polarizer comprises at least one of bulk optic polarizer, a polarizing fiber, a polarizing beam splitter, or a polarizing fiber amplifier configured to selectively transmit the at least a portion of the input signal therethrough; and
the output polarizer comprises at least one of bulk optic polarizer, a polarizing fiber, a polarizing beam splitter, or a polarizing fiber amplifier configured to selectively transmit the at least a portion of the polarization-state-altered signal based on the polarization state thereof.

13. The power selective optical filter device of claim 11 wherein the first, second, third, and fourth polarization-maintaining fibers are fusion spliced together to form an integral fiber structure.

14. The power selective optical filter device of claim 11 wherein the fast axis of the first polarization-maintaining fiber is oriented at an angle of Θ with respect to the transmission axis of the input polarizer, and a fast axis of the third polarization-maintaining fiber is oriented at an angle substantially equal to −Θ with respect to the transmission axis of the input polarizer, wherein the angle Θ is about 17.5 degrees to about 27.5 degrees.

15. The power selective optical filter device of claim 14 wherein the angle Θ is about 22.5 degrees.

16. The power selective optical filter device of claim 7 wherein the fast axis of the entry wave plate of the first substantially zero-order, zero-wave plate is oriented at an angle of Θ with respect to the transmission axis of the input polarizer, and a fast axis of the entry wave plate of the second substantially zero-order, zero-wave plate is substantially equal to −Θ with respect to the transmission axis of the input polarizer, wherein the angle Θ is about 17.5 degrees to about 27.5 degrees.

17. The power selective optical filter device of claim 16 wherein the angle Θ is about 22.5 degrees.

18. The power selective optical filter device of claim 7 wherein:
the input polarizer comprises an input bulk optical medium configured selectively transmit the at least a portion of the input signal; and
the output polarizer comprises an bulk optical medium configured to either selectively transmit the at least a portion of the polarization-state-altered signal based on the polarization state thereof.

19. The power selective optical filter device of claim 7 wherein the wave-plate structure exhibits a transmittance generally described by the equation $$\mathrm{Sin}^4\left[\frac{\pi P_{input}}{2P_{T=100\%}}\right],$$

wherein P is the power of the at least a portion of the input light received by the wave-plate structure and $P_{T=100\%}$ is a constant that is equal to the power of the at least a portion of the input signal received by the wave-plate structure when the transmittance is about 100 percent.

20. The power selective optical filter device of claim 7 wherein the selected entry-wave-plate angles of the first and second substantially zero-order, zero-wave plates are chosen so that the wave-plate structure alters the polarization state by approximately 90 degrees when the at least a portion of the input signal is at a selected power.

21. The power selective optical filter device of claim 7 wherein the extinction ratio for the input signal, when the input signal is at lower power, does not substantially depend on the wavelength of the input signal.

22. An optical system, comprising:
a pulsed seed laser configured to output a low-peak-power pulse;
a first fiber amplifier positioned to receive the low-peak-power pulse from the pulsed seed laser, the first fiber amplifier configured to amplify the low-peak-power pulse to generate an amplified pulse;
the power selective optical filter device of claim 7 positioned to receive the amplified pulse from the first fiber amplifier and configured transmit the amplified pulse while substantially blocking amplified spontaneous emission output from the first fiber amplifier; and
a second fiber amplifier positioned to receive the transmitted amplified pulse and configured amplify the transmitted amplified pulse.

23. An optical system, comprising:
a pulsed laser configured to output a pulse;
one or more surfaces generating back-reflected pulses in response to receiving the pulse; and
the power selective optical filter device of claim 7 positioned between the pulsed laser and the one or more surfaces and configured to substantially block the back-reflected pulse from being received by the pulsed laser.

24. An optical system, comprising:
a pulsed laser configured to output a temporally broad pulse; and
the power selective optical filter device of claim 7 positioned to receive the temporally broad pulse and configured to output a temporally narrowed output pulse.

25. An optical system, comprising:
a pulsed laser configured to output a pulse having a first temporal pulse shape; and
the power selective optical filter device of claim 7 positioned to receive the pulse and configured to output a shaped pulse having a second temporal pulse shape that is different than that of the first temporal pulse shape.

26. An optical system, comprising:
a pulsed laser configured to output a pulse comprising a main pulse and one or more after-pulses and/or pre-pulses;
the power selective optical filter device of claim 7 positioned to receive the pulse from the pulsed laser and substantially block transmission of the one or more after-pulse and/or pre-pulses while allowing transmission of the main pulse; and
a fiber amplifier positioned to receive the transmitted main pulse and configured to amplify and output the main pulse.

27. The optical system of claim 26 wherein the pulsed laser is configured as a microchip seed laser.

28. An optical system, comprising:
a pulsed laser configured to output a pulse;
a fiber amplifier; and
the power selective optical filter device of claim 7 positioned between the microchip seed laser and the fiber amplifier, the power selective optical filter device of claim 7 configured to substantially optically isolate the pulsed laser from amplified spontaneous emission output from the fiber amplifier and isolate the fiber amplifier from low-power signals output from the pulsed laser while allowing transmission of at least a portion of the pulse to the fiber amplifier for amplification.

29. An optical system, comprising:
a laser configured to output an input waveform;
an amplitude modulator configurable between a transmitting state and a non-transmitting state, the amplitude modulator substantially blocking transmission of the input waveform and transmitting a low-peak-power leakage pulse in the non-transmitting state, and transmitting the input waveform in the transmitting state; and
the power selective optical filter device of claim 7 configured to substantially block the low-peak-power leakage pulse and transmit the input waveform.

30. An optical system, comprising:
a laser defining an optical cavity having a gain medium disposed therein; and
the power selective optical filter device of claim 7 disposed in the optical cavity and configured to substantially block high-peak-power pulses and transmit low power signals generated within the optical cavity.

31. An optical system, comprising:
a pulsed laser configured to output an input pulse train including one or more pulses having a peak power at or below a threshold power and one or more rogue pulses having a peak power above the threshold power; and
the power selective optical filter device of claim 7 configured to reduce the peak power of the one or more rogue pulses to be at or below the threshold power.

32. An optical system, comprising:
a pulsed laser configured to output an input pulse train having a plurality of pulses;
the power selective optical filter device of claim 7 positioned to receive the input pulse train;
a control pulse source configured to output one or more control pulses that are transmitted through the power selective optical filter device of claim 7 at substantially the same time as a selected one of the plurality of pulses; and
wherein the power selective optical filter device of claim 7 is configured to allow transmission of the selected one of the plurality of pulses.

33. An optical system, comprising:
a laser defining an optical cavity having a gain medium disposed therein; and
the power selective optical filter device of claim 7 disposed in the optical cavity and configured to mode lock the output from the gain medium.

34. An optical system, comprising:
a laser defining an optical cavity having a gain medium disposed therein; and
the power selective optical filter device of claim 7 configured to selectively output high-peak-power pulses from the optical cavity.

35. An optical system, comprising:
a laser including an optical cavity having a gain medium disposed therein;
the power selective optical filter device of claim 7 disposed in the optical cavity; and
a control pulse source configured to output one or more control pulses that are transmitted into and through the power selective optical filter device of claim 7 to increase the power of light circulating in the optical cavity so that the light is transmitted through the power selective optical filter device of claim 7 and dumped out of the optical cavity.

36. A method of selectively modifying an input signal using a power selective optical filter device including a wave-plate structure disposed between an input polarizer and an output polarizer, the method comprising:
transmitting at least a portion of the input signal through the input polarizer and into the wave-plate structure;
altering a polarization state of the input signal as the input signal passes through the wave-plate structure in a manner that is dependent on the power of the input signal;
transmitting the altered-polarization-state signal out of the wave-plate structure; and
selectively blocking at least a portion of the altered-polarization-state signal with the output polarizer based on a polarization state thereof or selectively transmitting at least a portion of the altered-polarization-state signal through the output polarizer based on a polarization state thereof.

37. The method of claim 36 wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively blocking about 100 percent of the at least a portion of the altered-polarization-state signal with the output polarizer or selectively transmitting about 100 percent of the at least a portion of the altered-polarization-state signal through the output polarizer.

38. The method of claim 36, further comprising:
wherein the input signal is provided from a first fiber amplifier;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the at least a portion of the altered-polarization-state signal through the output polarizer;
amplifying the at least a portion of the altered-polarization-state signal with a second fiber amplifier that is transmitted through the output polarizer; and
substantially blocking amplified spontaneous emission output from the first and second fiber amplifiers with the power selective optical filter device.

39. The method of claim 36, further comprising:
wherein the input signal is provided from a pulsed laser;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the at least a portion of the altered-polarization-state signal through the output polarizer; and
substantially blocking a back-reflected signal from being coupled back to the pulsed laser with the power selective optical filter device.

40. The method of claim 36, further comprising:
wherein the input signal is a temporally broad input pulse provided from a pulsed laser;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting high power portions of the temporally broad pulse through the output polarizer; and
selectively blocking low power portions of the temporally broad input pulse with the output polarizer, which pass through and are output from the wave-plate structure.

41. The method of claim 36, further comprising:
wherein the input signal is an input pulse provided from a pulsed laser that exhibits a temporal pulse shape;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises altering the temporal pulse shape of the input pulse that is transmitted through the output polarizer.

42. The method of claim 36:
wherein the input signal comprises a main pulse and one or more after-pulses and/or pre-pulses;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the main pulse; and
selectively blocking the one or more after-pulses and/or pre-pulses with the output polarizer, which passes through and is output from the wave-plate structure.

43. The method of claim 36:
wherein the input signal comprises a main pulse output from a pulsed laser;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the main pulse out of the output polarizer;
selectively blocking low power signals output from the pulsed laser with the output polarizer, which passes through and are output from the wave-plate structure, from being received by a fiber amplifier; and
selectively blocking amplified spontaneous emission output from the fiber amplifier with the input polarizer, which passes through and is output from the wave-plate structure, from being received by the pulsed laser.

44. The method of claim 36:
wherein the input signal comprises a low-amplitude leakage pulse or a high-amplitude input pulse that is output from an amplitude modulator; and
wherein selectively blocking at least a portion of the altered-polarization-state signal with the output polarizer based on a polarization state thereof or selectively transmitting at least a portion of the altered-polarization-state signal through the output polarizer based on a polarization state thereof comprises transmitting the high-amplitude input pulse only when the amplitude modulator is in a transmitting state; and
blocking the low-amplitude leakage pulse that passes through and is output from the wave-plate structure with the output polarizer only when the amplitude modulator is in a non-transmitting state.

45. The method of claim 36:
wherein the input signal comprises low power signals and high-power peak pulses output from an optical cavity of a laser;
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the lower power signals; and
selectively blocking the high-power peak pulses with the output polarizer, which pass through and are output from the wave-plate structure.

46. The method of claim 36:
wherein the input signal comprises an input pulse train including one or more pulses having a peak power at or below a threshold power and one or more rogue pulses having a peak power above the threshold power; and
wherein selectively blocking at least a portion of the altered-polarization-state signal with the output polarizer based on a polarization state thereof or selectively transmitting at least a portion of the altered-polarization-state signal through the output polarizer based on a polarization state thereof comprises reducing the peak power of the one or more rogue pulses to be at or below the threshold power and transmitting the one or more pulses having the peak power at or below the threshold power.

47. The method of claim 36:
wherein the input signal comprises an input pulse train including a plurality of pulses;
wherein altering a polarization state of the input signal as the input signal passes through the wave-plate structure in a manner that is dependent on the power of the input signal occurs in response to one or more control pulses passing through the wave-plate structure substantially contemporaneously with a selected one of the plurality of pulses to increase a power thereof; and
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting the selected one of the plurality of pulses through the output polarizer.

48. The method of claim 36:
wherein the input signal comprises a signal generated within an optical cavity of a laser; and
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively transmitting at least a portion of the altered-polarization-state signal through the output polarizer.

49. The method of claim 36:
wherein the input signal comprises an optical signal circulating through the power selective optical filter device within an optical cavity;
wherein altering a polarization state of the input signal as the input signal passes through the wave-plate structure in a manner that is dependent on the power of the input signal occurs in response to one or more control pulses passing through the wave-plate structure substantially contemporaneously with the circulating signal passing through the wave-plate structure; and
wherein selectively blocking at least a portion of the altered-polarization-state signal with the output polarizer based on a polarization state thereof or selectively transmitting at least a portion of the altered-polarization-state signal through the output polarizer based on a polarization state thereof comprises selectively dumping the circulating signal out of the optical cavity for the duration that the control pulse passes through the wave-plate structure.

* * * * *